(12) United States Patent
Peng

(10) Patent No.: US 11,057,221 B2
(45) Date of Patent: Jul. 6, 2021

(54) BLOCKCHAIN-BASED CONSENSUS PROCESS

(71) Applicant: ALIPAY (HANGZHOU) INFORMATION TECHNOLOGY CO., LTD., Zhejiang (CN)

(72) Inventor: Yujun Peng, Hangzhou (CN)

(73) Assignee: Alipay (Hangzhou) Information Technology Co., Ltd., Zhejiang (CN)

(*) Notice: Subject to any disclaimer, the term of this patent is extended or adjusted under 35 U.S.C. 154(b) by 0 days.

(21) Appl. No.: 17/138,739

(22) Filed: Dec. 30, 2020

(65) Prior Publication Data

US 2021/0126797 A1 Apr. 29, 2021

Related U.S. Application Data

(63) Continuation of application No. PCT/CN2020/076474, filed on Feb. 24, 2020.

(51) Int. Cl.
*H04L 9/32* (2006.01)
*H04L 9/08* (2006.01)

(52) U.S. Cl.
CPC .......... *H04L 9/3247* (2013.01); *H04L 9/0825* (2013.01); *H04L 2209/38* (2013.01); *H04L 2209/463* (2013.01)

(58) Field of Classification Search
CPC . H04L 9/3247; H04L 9/0825; H04L 2209/38; H04L 2209/463
See application file for complete search history.

(56) References Cited

U.S. PATENT DOCUMENTS

| 10,361,859 B2 * | 7/2019 | Clark ................... H04L 9/3239 |
| 2019/0114706 A1 | 4/2019 | Bell et al. |

(Continued)

FOREIGN PATENT DOCUMENTS

| CN | 108256859 | 7/2017 |
| CN | 109685551 | 4/2019 |

(Continued)

OTHER PUBLICATIONS

Singh et al, "Sidechain technologies in blockchain networks: An examination and state-of-the-art review", Oct. 24, 2019, Journal of Network and Computer Applications, p. 1-16.*

(Continued)

*Primary Examiner* — Christopher A Revak
(74) *Attorney, Agent, or Firm* — Fish & Richardson P.C.

(57) ABSTRACT

Disclosed herein are methods, systems, and apparatus for blockchain-based consensus process having enhanced security. One of the methods includes executing a first smart contract on a first blockchain. Executing the consensus smart contract includes executing code for implementing a consensus process for determining consensus among two or more consensus nodes according to a set of one or more consensus rules. A private key of the consensus smart contract corresponding to the public key is stored in a key management system associated with the second blockchain. The consensus smart contract uses the private key to digitally sign a message requesting a vote, and sends the digitally signed message to the two or more consensus nodes. The public key of the consensus smart contract enables the consensus nodes to validate the message sent from the consensus smart contract. A result of execution of the consensus smart contract are recorded in the first or second blockchain.

20 Claims, 9 Drawing Sheets

(56) References Cited

U.S. PATENT DOCUMENTS

| | | | |
|---|---|---|---|
| 2019/0244306 A1 | 8/2019 | Kursun | |
| 2019/0386834 A1* | 12/2019 | Furukawa | G06F 21/64 |
| 2020/0052880 A1 | 2/2020 | Bathen et al. | |
| 2020/0074450 A1* | 3/2020 | Fletcher | G06Q 20/065 |
| 2020/0143372 A1* | 5/2020 | Liu | H04L 9/0643 |
| 2020/0334677 A1* | 10/2020 | Hari | H04L 9/3239 |
| 2020/0394651 A1* | 12/2020 | Kreder, III | G06Q 20/22 |

FOREIGN PATENT DOCUMENTS

| | | |
|---|---|---|
| CN | 110245183 | 9/2019 |
| CN | 110781526 | 2/2020 |
| WO | WO 2018152519 | 8/2018 |

OTHER PUBLICATIONS

Dr Arati Baliga, "The Blockchain Landscape", 2017, Persistent Systems, p. 1-21.*

Crosby et al., "BlockChain Technology: Beyond Bitcoin," Sutardja Center for Entrepreneurship & Technology Technical Report, Oct. 16, 2015, 35 pages.

Nakamoto, "Bitcoin: A Peer-to-Peer Electronic Cash System," www.bitcoin.org, 2005, 9 pages.

PCT International Search Report and Written Opinion in International Application No. PCT/CN2020/076474, dated Nov. 27, 2020, 8 pages.

Extended European Search Report in European Application No. 20725743.7 dated May 10, 202, 7 pages.

\* cited by examiner

470

472

Execute a first smart contract on a first blockchain, wherein the first smart contract includes code for implementing a first process having a plurality of stages, one of the stages includes executing a consensus smart contract on a second blockchain, in which the first and second blockchain are the same or different.

Execute code for implementing a consensus process for determining consensus among two or more consensus nodes according to a set of one or more consensus rules, the consensus smart contract includes information about a contact method for each of the consensus nodes, the consensus smart contract includes a public key, wherein a private key of the consensus smart contract corresponding to the public key is stored in a key management system associated with the second blockchain; wherein the consensus smart contract uses the private key of the consensus smart contract to digitally sign a message requesting a vote, and sends the digitally signed message to the two or more consensus nodes, wherein the public key of the consensus smart contract enables the consensus nodes to validate the message sent from the consensus smart contract.

474

Record a result of execution of the consensus smart contract in the first or second blockchain.

FIG. 9

BLOCKCHAIN-BASED CONSENSUS PROCESS

CROSS-REFERENCE TO RELATED APPLICATIONS

This application is a continuation of PCT Application No. PCT/CN2020/076474, filed on Feb. 24, 2020, which is hereby incorporated by reference in its entirety.

TECHNICAL FIELD

This specification relates to blockchain-based consensus process having enhanced security.

BACKGROUND

Distributed ledger systems (DLSs), which can also be referred to as consensus networks, and/or blockchain networks, enable participating entities to securely, and immutably store data. DLSs are commonly referred to as blockchain networks without referencing any particular user case. Examples of types of blockchain networks can include public blockchain networks, private blockchain networks, and consortium blockchain networks. A consortium blockchain network is provided for a select group of entities, which control the consensus process, and includes an access control layer. To achieve consensus (e.g., agreement to the addition of a block to a blockchain), a consensus protocol is implemented within the consortium blockchain network. For example, the consortium blockchain network can implement a practical Byzantine fault tolerance (PBFT) consensus.

When multiple parties participate in a project, the parties may need to reach an agreement on certain issues before the project can be completed. For example, the parties may draft a contract specifying that certain documents need to be approved by specific parties at specific stages of the project. In some examples, the documents are manually sent to the parties that need to provide the approvals. Each time there is a new project, a new contract is drafted, which may again specify that certain documents need to be approved by specific parties at specific stages of the project.

It would be desirable to have a mechanism that provides flexibility in the manner in which the parties reach consensus, and provides enhanced security in the consensus process.

SUMMARY

Described embodiments of the subject matter can include one or more features, alone or in combination.

For example, in one embodiment, a computer-implemented method for implementing processes that include determining consensus among a plurality of consensus nodes is provided. The method includes: providing a plurality of process smart contracts, in which each process smart contract is configured to execute on a first blockchain, each process smart contract includes code for implementing a process that includes two or more steps, at least one of the steps involves determining whether a consensus is reached regarding whether to approve or reject an item, and at least one of the steps involves performing an action based on the determination of whether a consensus is reached; providing a plurality of consensus smart contracts, in which each process smart contract is configured to execute on a second blockchain, each consensus smart contract includes code for implementing a process for determining consensus among a plurality of consensus nodes according to one or more consensus rules, each consensus smart contract includes a public key, wherein a private key of the consensus smart contract corresponding to the public key is stored in a key management system associated with the second blockchain, and wherein the first blockchain and the second blockchain can be the same blockchain or different blockchains; and executing two or more process smart contracts, including for each process smart contract, calling one or more consensus smart contracts, in which each consensus smart contract is configured to determine whether a consensus is reached among a plurality of consensus nodes, wherein a same consensus smart contract is called by multiple process smart contracts, wherein the consensus smart contract uses the private key of the consensus smart contract to digitally sign a message requesting a vote on whether to approve or reject an item, and sends the digitally signed message to the plurality of consensus nodes, wherein the public key of the consensus smart contract enables the consensus nodes to validate the message sent from the consensus smart contract, and performing an action based on the result of the determination of whether a consensus is reached.

In some embodiments, these general and specific aspects may be implemented using a system, a method, or a computer program, or any combination of systems, methods, and computer programs. The foregoing and other described embodiments can each, optionally, include one or more of the following aspects:

In some embodiments, at least one of the consensus smart contracts includes a consensus rule specifying that a consensus among a group of consensus nodes is reached based on a statistical function of votes associated with the consensus nodes, and the statistical function is configured to enable the consensus to be reached after obtaining votes from less than all of the group of consensus nodes.

In some embodiments, the consensus rule specifies that a consensus among the group of consensus nodes is reached if a percentage of the consensus nodes that give approval votes is greater than a predetermined percentage value.

In some embodiments, at least one of the consensus smart contracts includes a consensus rule specifying that after a consensus node receives a request for approval, the consensus node is deemed to have given approval vote if the consensus node does not respond within a predetermined period of time.

In some embodiments, at least one of the consensus smart contracts includes a consensus rule specifying that after a consensus node receives a request for approval, the consensus node is deemed to abstain from voting if the consensus node does not respond within a predetermined period of time.

In some embodiments, at least one of the consensus smart contracts specifies at least one of (i) circumstances in which the consensus smart contract is effective and can be called by a process smart contract, or (ii) circumstances in which the consensus smart contract is ineffective and cannot be called by a process smart contract.

In some embodiments, each consensus smart contract specifies at least one of (i) a first period of time that the consensus smart contract is effective and can be called by a process smart contract, in which outside the first period of time the consensus smart contract is ineffective and cannot be called by a process smart contract, or (ii) a first range of block heights of a blockchain that the consensus smart contract is effective and can be called by a process smart contract, in which outside the first range of block heights of the blockchain the consensus smart contract is ineffective and cannot be called by a process smart contract.

In some embodiments, at least one of the consensus smart contracts includes a consensus rule specifying that a consensus regarding whether to approve or reject an item is sought from a first group of consensus nodes, and if a consensus cannot be obtained from the first group of consensus nodes, a consensus regarding whether to approve or reject the item is sought from a second group of consensus nodes.

In some embodiments, each consensus smart contract specifies a contact method for each of the consensus nodes, and upon execution the consensus smart contract sends a request for approval of the item to each consensus node using the contact method associated with the consensus node.

In some embodiments, at least one consensus smart contract is configured to accept an argument list that specifies which consensus nodes need to participate in the consensus process, and executing the process smart contract includes passing, from the process smart contract, a list of consensus nodes as arguments to the consensus smart contract.

In another embodiment, a computer-implemented method includes: executing a first smart contract on a first blockchain, wherein the first smart contract includes code for implementing a first process having a plurality of stages, one of the stages includes executing a consensus smart contract on a second blockchain, in which the first and second blockchain are the same or different, wherein executing the consensus smart contract includes executing code for implementing a consensus process for determining consensus among two or more consensus nodes according to a set of one or more consensus rules, the consensus smart contract includes information about a contact method for each of the consensus nodes, the consensus smart contract includes a public key, wherein a private key of the consensus smart contract corresponding to the public key is stored in a key management system associated with the second blockchain; wherein the consensus smart contract uses the private key of the consensus smart contract to digitally sign a message requesting a vote, and sends the digitally signed message to the two or more consensus nodes, wherein the public key of the consensus smart contract enables the consensus nodes to validate the message sent from the consensus smart contract; and recording a result of execution of the consensus smart contract in the first or second blockchain.

In some embodiments, these general and specific aspects may be implemented using a system, a method, or a computer program, or any combination of systems, methods, and computer programs. The foregoing and other described embodiments can each, optionally, include one or more of the following aspects:

In some embodiments, the set of one or more consensus rules specify that a consensus is reached based on a statistical function of votes associated with the consensus nodes, and the statistical function is configured to enable a consensus to be reached after obtaining votes from less than all of the consensus nodes.

In some embodiments, the set of one or more consensus rules specify that a consensus is reached if a percentage of consensus nodes that give approval votes is greater than a predetermined percentage value.

In some embodiments, the set of one or more consensus rules specify that after a consensus node receives a request for approval, the consensus node is deemed to have given approval if the consensus node does not respond within a predetermined period of time.

In some embodiments, the set of one or more consensus rules specify that after a consensus node receives a request for approval, the consensus node is deemed to abstain from voting if the consensus node does not respond within a predetermined period of time.

In some embodiments, the consensus smart contract specifies at least one of (i) circumstances in which the consensus smart contract is effective and can be called by the first smart contract, or (ii) circumstances in which the consensus smart contract is ineffective and cannot be called by the first smart contract.

In some embodiments, the consensus smart contract specifies at least one of (i) what period of time the consensus smart contract is effective and can be called by the first smart contract, or (ii) a range of block height of a blockchain for which the consensus smart contract is effective and can be called by the first smart contract.

In some embodiments, the set of one or more consensus rules specify that a consensus regarding whether to approve or reject an item is sought from a first group of consensus nodes, and if a consensus cannot be obtained from the first group of consensus nodes, a consensus regarding whether to approve or reject the item is sought from a second group of consensus nodes.

In some embodiments, the consensus smart contract is configured to accept an argument list that specifies which consensus nodes need to participate in the consensus process, and executing the first smart contract includes passing, from the first smart contract, a list of consensus nodes as arguments to the consensus smart contract.

It is appreciated that methods in accordance with this specification may include any combination of the aspects and features described herein. That is, methods in accordance with this specification are not limited to the combinations of aspects and features specifically described herein, but also include any combination of the aspects and features provided.

The details of one or more embodiments of this specification are set forth in the accompanying drawings and the description below. Other features and advantages of this specification will be apparent from the description and drawings, and from the claims.

BRIEF DESCRIPTION OF THE DRAWINGS

FIGS. 8 and 9 are flow diagrams of examples of processes for implementing processes that include determining consensus among a plurality of consensus nodes.

Like reference numbers and designations in the various drawings indicate like elements.

DETAILED DESCRIPTION

Figure 1:
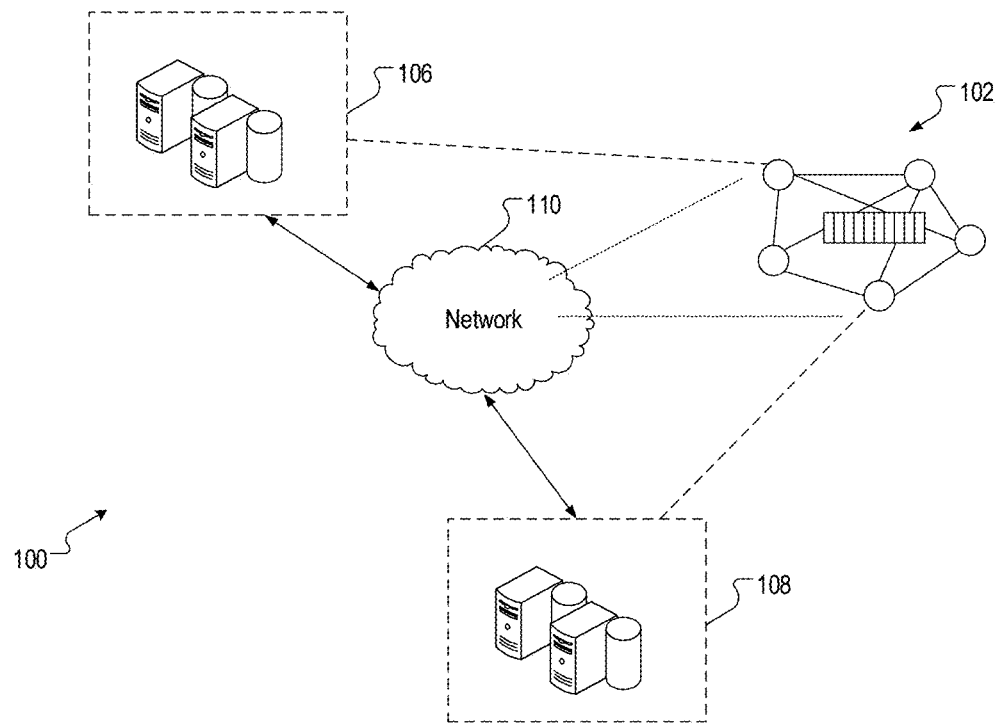
FIG. 1 is a diagram illustrating an example of an environment that can be used to execute embodiments of this specification.

This specification describes technologies for enabling efficient management of smart contracts that incorporate consensus rules specifying how consensus should be reached by multiple parties. Multiple types of consensus rules each having a different consensus logic can be implemented, and some of the consensus rules may involve novel and/or complex functions. These technologies generally involve a first type of smart contracts (referred to as process smart contracts) that include code for implementing a process, such as a series of commercial transactions among multiple parties. A second type of smart contracts (referred to as consensus smart contracts) include code for implementing a consensus process according consensus logic expressed as one or more consensus rules. The same consensus smart contracts can be incorporated into multiple process smart contracts or multiple parts of process smart contracts. By updating the consensus rules in a consensus smart contract, all the process smart contracts that incorporate the consensus smart contract can also be updated. In some implementations, each consensus smart contract includes a public key that is used by consensus nodes for securely transmitting votes to the consensus smart contract, in which a private key corresponding to the public key is stored in a key management system associated with a blockchain.

The techniques described in this specification produce several technical effects. The consensus smart contracts enable online blockchain-based transactions that require consensus from multiple parties to be implemented with enhanced security, flexibility, and efficiency. Using consensus smart contracts that are separate from process smart contracts allows information about parties that need to approve a transaction to be maintained more accurately, reducing the security risk that the wrong parties are asked to approve transactions due to outdated information about the parties required for consensus. Because the votes are transmitted from the consensus nodes to the consensus smart contract using encrypted messages, the risk of the votes being tampered with is reduced. By enabling the consensus rules to incorporate functions, the consensus process can be implemented based on information obtained after the process smart contracts and consensus smart contracts have been written. Managing the consensus rules of a large number (e.g., thousands or millions) or process smart contracts can be performed efficiently and accurately by updating information in a small number of reusable consensus smart contracts. In some examples, consensus smart contract templates can be combined into a kit or library in which the consensus smart contract templates form "building blocks" that can be individually combined to provide a tailor-made solution for an application. The results of voting or approvals by the consensus parties are recorded in a blockchain and can be verified by all parties.

To provide further context for embodiments of this specification, and as introduced above, distributed ledger systems (DLSs), which can also be referred to as consensus networks (e.g., made up of peer-to-peer nodes), and blockchain networks, enable participating entities to securely, and immutably conduct transactions, and store data. Although the term blockchain is generally associated with particular networks, and/or use cases, blockchain is used herein to generally refer to a DLS without reference to any particular use case.

A blockchain is a data structure that stores transactions in a way that the transactions are immutable. Thus, transactions recorded on a blockchain are reliable and trustworthy. A blockchain includes one or more blocks. Each block in the chain is linked to a previous block immediately before it in the chain by including a cryptographic hash of the previous block. Each block also includes a timestamp, its own cryptographic hash, and one or more transactions. The transactions, which have already been verified by the nodes of the blockchain network, are hashed and encoded into a Merkle tree. A Merkle tree is a data structure in which data at the leaf nodes of the tree is hashed, and all hashes in each branch of the tree are concatenated at the root of the branch. This process continues up the tree to the root of the entire tree, which stores a hash that is representative of all data in the tree. A hash purporting to be of a transaction stored in the tree can be quickly verified by determining whether it is consistent with the structure of the tree.

Whereas a blockchain is a decentralized or at least partially decentralized data structure for storing transactions, a blockchain network is a network of computing nodes that manage, update, and maintain one or more blockchains by broadcasting, verifying and validating transactions, etc. As introduced above, a blockchain network can be provided as a public blockchain network, a private blockchain network, or a consortium blockchain network. Embodiments of this specification are described in further detail herein with reference to a consortium blockchain network. It is contemplated, however, that embodiments of this specification can be realized in any appropriate type of blockchain network.

In general, a consortium blockchain network is private among the participating entities. In a consortium blockchain network, the consensus process is controlled by an authorized set of nodes, which can be referred to as consensus nodes, one or more consensus nodes being operated by a respective entity (e.g., a financial institution, insurance company). For example, a consortium of ten (10) entities (e.g., financial institutions, insurance companies) can operate a consortium blockchain network, each of which operates at least one node in the consortium blockchain network.

In some examples, within a consortium blockchain network, a global blockchain is provided as a blockchain that is replicated across all nodes. That is, all consensus nodes are in perfect state consensus with respect to the global blockchain. To achieve consensus (e.g., agreement to the addition of a block to a blockchain), a consensus protocol is implemented within the consortium blockchain network. For example, the consortium blockchain network can implement a practical Byzantine fault tolerance (PBFT) consensus, described in further detail below.

FIG. 1 is a diagram illustrating an example of an environment 100 that can be used to execute embodiments of this specification. In some examples, the environment 100 enables entities to participate in a consortium blockchain network 102. The environment 100 includes computing systems 106, 108, and a network 110. In some examples, the network 110 includes a local area network (LAN), wide area network (WAN), the Internet, or a combination thereof, and connects web sites, user devices (e.g., computing devices), and back-end systems. In some examples, the network 110 can be accessed over a wired and/or a wireless communications link. In some examples, the network 110 enables communication with, and within the consortium blockchain network 102. In general the network 110 represents one or more communication networks. In some cases, the computing systems 106, 108 can be nodes of a cloud computing system (not shown), or each of the computing systems 106, 108 can be a separate cloud computing system including a number of computers interconnected by a network and functioning as a distributed processing system.

In the depicted example, the computing systems 106, 108 can each include any appropriate computing device that enables participation as a node in the consortium blockchain network 102. Examples of computing devices include, without limitation, a server, a desktop computer, a laptop computer, a tablet computing device, and a smartphone. In some examples, the computing systems 106, 108 host one or more computer-implemented services for interacting with the consortium blockchain network 102. For example, the computing system 106 can host computer-implemented services of a first entity (e.g., user A), such as a transaction management system that the first entity uses to manage its transactions with one or more other entities (e.g., other users). The computing system 108 can host computer-implemented services of a second entity (e.g., user B), such as a transaction management system that the second entity uses to manage its transactions with one or more other entities (e.g., other users). In the example of FIG. 1, the consortium blockchain network 102 is represented as a peer-to-peer network of nodes, and the computing systems 106, 108 provide nodes of the first entity, and second entity respectively, which participate in the consortium blockchain network 102.

Figure 2:
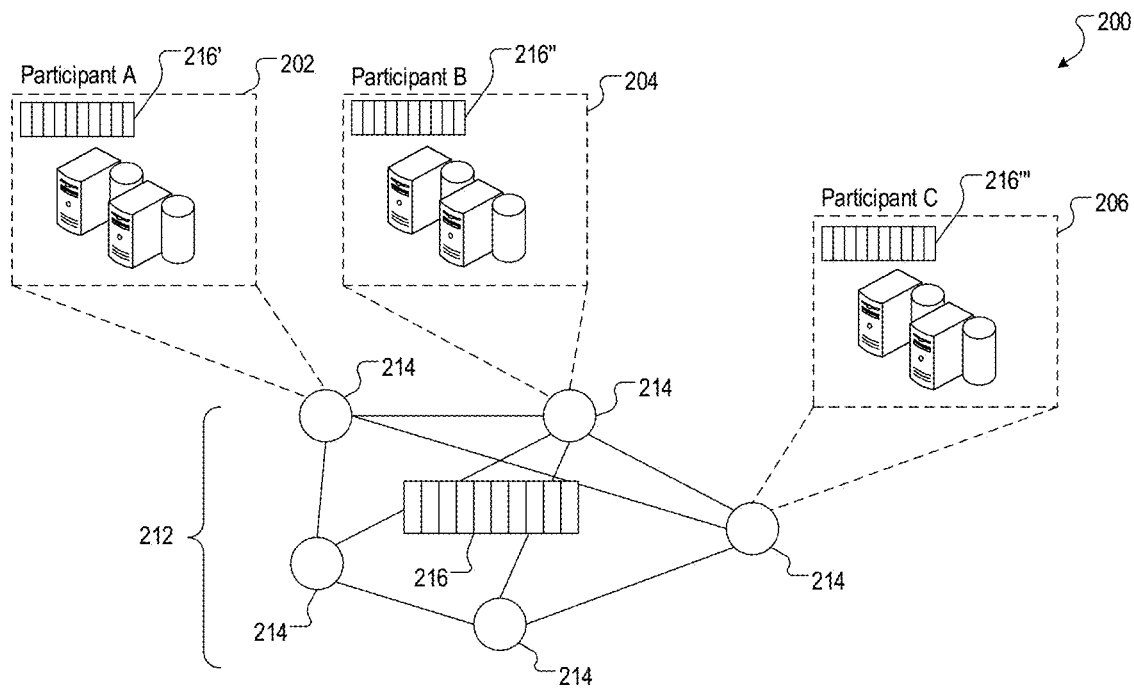
FIG. 2 is a diagram illustrating an example of an architecture in accordance with embodiments of this specification.

FIG. 2 depicts an example of an architecture 200 in accordance with embodiments of this specification. The example conceptual architecture 200 includes participant systems 202, 204, 206 that correspond to Participant A, Participant B, and Participant C, respectively. Each participant (e.g., user, enterprise) participates in a blockchain network 212 provided as a peer-to-peer network including a plurality of nodes 214, at least some of which immutably record information in a blockchain 216. Although a single blockchain 216 is schematically depicted within the blockchain network 212, multiple copies of the blockchain 216 are provided, and are maintained across the blockchain network 212, as described in further detail herein.

In the depicted example, each participant system 202, 204, 206 is provided by, or on behalf of Participant A, Participant B, and Participant C, respectively, and functions as a respective node 214 within the blockchain network. As used herein, a node generally refers to an individual system (e.g., computer, server) that is connected to the blockchain network 212, and enables a respective participant to participate in the blockchain network. In the example of FIG. 2, a participant corresponds to each node 214. It is contemplated, however, that a participant can operate multiple nodes 214 within the blockchain network 212, and/or multiple participants can share a node 214. In some examples, the participant systems 202, 204, 206 communicate with, or through the blockchain network 212 using a protocol (e.g., hypertext transfer protocol secure (HTTPS)), and/or using remote procedure calls (RPCs).

Nodes 214 can have varying degrees of participation within the blockchain network 212. For example, some nodes 214 can participate in the consensus process (e.g., as miner nodes that add blocks to the blockchain 216), while other nodes 214 do not participate in the consensus process. As another example, some nodes 214 store a complete copy of the blockchain 216, while other nodes 214 only store copies of portions of the blockchain 216. For example, data access privileges can limit the blockchain data that a respective participant stores within its respective system. In the example of FIG. 2, the participant systems 202, 204, and 206 store respective, complete copies 216', 216'', and 216''' of the blockchain 216.

A blockchain (e.g., the blockchain 216 of FIG. 2) is made up of a chain of blocks, each block storing data. Examples of data include transaction data representative of a transaction between two or more participants. While transactions are used herein by way of non-limiting example, it is contemplated that any appropriate data can be stored in a blockchain (e.g., documents, images, videos, audio). Examples of a transaction can include, without limitation, exchanges of something of value (e.g., assets, products, services, currency). The transaction data is immutably stored within the blockchain. That is, the transaction data cannot be changed.

Before storing in a block, the transaction data is hashed. Hashing is a process of transforming the transaction data (provided as string data) into a fixed-length hash value (also provided as string data). It is not possible to un-hash the hash value to obtain the transaction data. Hashing ensures that even a slight change in the transaction data results in a completely different hash value. Further, and as noted above, the hash value is of fixed length. That is, no matter the size of the transaction data the length of the hash value is fixed. Hashing includes processing the transaction data through a hash function to generate the hash value. An example of a hash function includes, without limitation, the secure hash algorithm (SHA)-256, which outputs 256-bit hash values.

Transaction data of multiple transactions are hashed and stored in a block. For example, hash values of two transactions are provided, and are themselves hashed to provide another hash. This process is repeated until, for all transactions to be stored in a block, a single hash value is provided. This hash value is referred to as a Merkle root hash, and is stored in a header of the block. A change in any of the transactions will result in change in its hash value, and ultimately, a change in the Merkle root hash.

Blocks are added to the blockchain through a consensus protocol. Multiple nodes within the blockchain network participate in the consensus protocol, and perform work to have a block added to the blockchain. Such nodes are referred to as consensus nodes. PBFT, introduced above, is used as a non-limiting example of a consensus protocol. The consensus nodes execute the consensus protocol to add transactions to the blockchain, and update the overall state of the blockchain network.

In further detail, the consensus node generates a block header, hashes all of the transactions in the block, and combines the hash value in pairs to generate further hash values until a single hash value is provided for all transactions in the block (the Merkle root hash). This hash is added to the block header. The consensus node also determines the hash value of the most recent block in the blockchain (i.e., the last block added to the blockchain). The consensus node also adds a nonce value, and a timestamp to the block header.

In general, PBFT provides a practical Byzantine state machine replication that tolerates Byzantine faults (e.g., malfunctioning nodes, malicious nodes). This is achieved in PBFT by assuming that faults will occur (e.g., assuming the existence of independent node failures, and/or manipulated messages sent by consensus nodes). In PBFT, the consensus nodes are provided in a sequence that includes a primary consensus node, and backup consensus nodes. The primary consensus node is periodically changed. Transactions are added to the blockchain by all consensus nodes within the blockchain network reaching an agreement as to the world state of the blockchain network. In this process, messages are transmitted between consensus nodes, and each consensus nodes proves that a message is received from a specified peer node, and verifies that the message was not modified during transmission.

In PBFT, the consensus protocol is provided in multiple phases with all consensus nodes beginning in the same state. To begin, a client sends a request to the primary consensus node to invoke a service operation (e.g., execute a transaction within the blockchain network). In response to receiving the request, the primary consensus node multicasts the request to the backup consensus nodes. The backup consensus nodes execute the request, and each sends a reply to the client. The client waits until a threshold number of replies are received. In some examples, the client waits for f+1 replies to be received, where f is the maximum number of faulty consensus nodes that can be tolerated within the blockchain network. The final result is that a sufficient number of consensus nodes come to an agreement on the order of the record that is to be added to the blockchain, and the record is either accepted, or rejected.

In some blockchain networks, cryptography is implemented to maintain privacy of transactions. For example, if two nodes want to keep a transaction private, such that other nodes in the blockchain network cannot discern details of the transaction, the nodes can encrypt the transaction data. An example of cryptography includes, without limitation, symmetric encryption, and asymmetric encryption. Symmetric encryption refers to an encryption process that uses a single key for both encryption (generating ciphertext from plaintext), and decryption (generating plaintext from ciphertext). In symmetric encryption, the same key is available to multiple nodes, so each node can en-/de-crypt transaction data.

Asymmetric encryption uses keys pairs that each include a private key, and a public key, the private key being known only to a respective node, and the public key being known to any or all other nodes in the blockchain network. A node can use the public key of another node to encrypt data, and the encrypted data can be decrypted using other node's private key. For example, and referring again to FIG. 2, Participant A can use Participant B's public key to encrypt data, and send the encrypted data to Participant B. Participant B can use its private key to decrypt the encrypted data (ciphertext) and extract the original data (plaintext). Messages encrypted with a node's public key can only be decrypted using the node's private key.

Asymmetric encryption is used to provide digital signatures, which enables participants in a transaction to confirm other participants in the transaction, as well as the validity of the transaction. For example, a node can digitally sign a message, and another node can confirm that the message was sent by the node based on the digital signature of Participant A. Digital signatures can also be used to ensure that messages are not tampered with in transit. For example, and again referencing FIG. 2, Participant A is to send a message to Participant B. Participant A generates a hash of the message, and then, using its private key, encrypts the hash to provide a digital signature as the encrypted hash. Participant A appends the digital signature to the message, and sends the message with digital signature to Participant B. Participant B decrypts the digital signature using the public key of Participant A, and extracts the hash. Participant B hashes the message and compares the hashes. If the hashes are same, Participant B can confirm that the message was indeed from Participant A, and was not tampered with.

The invention described in this specification relates to the management of consensus processes used in smart contracts associated with blockchains. When multiple parties collaborate on a project, smart contracts executing on one or more blockchains can be used to facilitate obtaining consensus among two or more of the parties involved with the project. Process smart contracts are used to implement processes for completing projects or transactions. The parties that are involved in a project may include, e.g., consumers, businesses, for-profit organizations, non-profit organizations, research institutions, financial institutions, or government agencies.

In some implementations, a smart contract is a set of computer code that run on top of a blockchain and includes a set of predefined rules that are agreed upon by two or more parties. Upon execution of the smart contract, if the set of predefined rules are met, the smart contract executes a certain set of code to product an output. The smart contract computer code allows decentralized automation by facilitating, verifying, and enforcing the conditions of an underlying agreement. The smart contracts are useful in business collaborations in which the smart contracts can be viewed as automatically executable lines of code that are associated with a blockchain and includes certain predetermined rules.

Many blockchain processing systems implement processes that include stages or steps that need consensus among multiple parties. For example, merchants can engage in transactions that involve large amounts of merchandise or goods that are transferred in and out of warehouses. In this example, warehouse receipts are useful tools for applying for loans from banks. In a conventional system, a warehouse receipt is endorsed and issued by a warehouse that can vouch for the receipt and safe storage of the merchandise or goods. The merchant who owns the goods stored in the warehouse can use the warehouse receipt to apply for a loan from the banks, using the goods stored in the warehouse as collateral. In the conventional system, the merchant has to wait for the warehouse to issue the warehouse receipt, and then take the warehouse receipt to the banks and insurance companies. The sequential processing of the warehouse receipt may cause some delays.

In some implementations, in a blockchain-based system, instead of waiting for the warehouse to issue a warehouse receipt, the merchant can initiate the generation of a warehouse receipt, and request the warehouse, the banks, and the insurance companies to endorse or approve the warehouse receipt, and request the banks to approve the loan. In this example, the banks and the insurance company can process the request for loan in parallel to the warehouse processing the request for endorsement of the warehouse receipt, which reduces that overall amount of time needed for the merchant to obtain the loan from the bank.

Smart contracts can be used to implement many types of business processes to facilitate many types of projects and transactions. Complicated smart contracts can be used to implement complicated business processes that follow complicated business logic. A complicated smart contract may at various stages require decisions to be made by multiple parties. Depending on the results of the decisions by the multiple parties, the smart contract may branch off in different process flows. For example, a process may include several decision points, and at each decision point, depending on whether the parties reach consensus to approve an item, the process may branch off in different paths. For different decision points, the parties that need to be involved for reaching consensus may be different. The rules for processing the votes from the parties in order to determine whether a consensus is reached can be complicated. The consensus rules can change over time. The parties involved in the consensus process can change over time. It is useful to decouple the portion of the smart contract dealing with consensus logic from the portion of the smart contract dealing with business logic.

For example, a company developing smart contracts to facilitate various processes, including business processes, can have a first team that is familiar with the business process to write and maintain the portions of the smart contracts that deal with business logic, and a second team that is familiar with the consensus process to write and maintain the portions of the smart contracts that deal with consensus logic. The first team can be familiar with the business processes internal to the company without having much information about external parties that need to participate in the consensus. The second team can be familiar with external parties and know the most efficient way to obtain votes from those external parties in order to determine consensus.

This specification describes a way of decoupling the portion of the smart contract dealing with consensus logic from the portion of the smart contract dealing with business logic by using two types of smart contracts. The first type of smart contracts is referred to as process smart contracts, which include code for implementing a process, such as a series of commercial transactions among multiple parties. For example, the process smart contracts can implement business logic for projects. The second type of smart contracts is referred to as consensus smart contracts, which include code for implementing a consensus process according consensus logic expressed as one or more consensus rules. In some implementations, the process smart contracts can call or invoke the consensus smart contracts where there is a need to obtains decisions from multiple parties. For example, a company can have a first team write and maintain the process smart contracts that deal with business logic, and a second team write and maintain the consensus smart contracts that deal with consensus logic.

The following are examples of processes that can be implemented by the smart contracts.

Example 1: An importer intends to use imported goods stored at a warehouse as collateral for obtaining a loan from banks. A smart contract can implement a process for obtaining a confirmation from a warehouse that the goods have been properly received at the warehouse, obtaining a confirmation from an insurance company that it is willing to insure the goods, and obtaining approval votes from banks that they are willing to grant a loan using the goods as collateral.

Example 2: A real estate developer obtained a construction loan from banks in which payments from the construction loan are distributed to contractors after milestones of the construction are met. A smart contract can implement a process for confirming that each milestone of the construction project has been met and obtaining approval votes from banks to distribute payments to the contractors.

Example 3: A group of banks provides microloans to individuals who use personal property (e.g., vehicles or jewelry) as collateral. A smart contract can implement a process for confirming the worth of the personal property by an inspector and obtaining votes from banks to approve a loan of a certain amount based on the value of the personal property.

Example 4: A manufacturer makes a product using several manufacturing steps in which some of the steps need to be certified by independent agencies. A smart contract can implement a process for sending relevant information to relevant agencies and obtaining votes from the agencies to approve certification.

In the examples above, it is useful to have a process smart contract to implement a business process according to business logic, and one or more consensus smart contracts to implement a consensus process according to consensus logic.

In some implementations, several types of consensus rules can be used for the consensus processes. For example, the parties may agree that a consensus is determined based on voting by the parties, each party can vote to approve or reject an item, or abstain from voting. Each party involved in the consensus process can be represented by a consensus node, which can be a computer server, a mobile phone, or any other computing device that can respond to requests from a smart contract.

The consensus process mentioned above refers to the process of reaching consensus among parties participating in the project. For example, the consensus process may involve two or more banks and one or more insurance companies giving approval to accept a warehouse receipt of goods as proof that the goods have been properly received by the warehouse. A record indicating that the parties reached consensus may be recorded in a consortium blockchain after consensus nodes of the consortium blockchain reach consensus according to a consensus protocol implemented within the consortium blockchain network. In order to differentiate the two types of consensus, the consensus among the parties is referred to as "process consensus," and the consensus among blockchain consensus nodes for determining whether to write a record into a blockchain is referred to as "blockchain consensus." The consensus nodes participating in the process consensus are referred to as process consensus nodes, and the consensus nodes participating in the blockchain consensus are referred to as blockchain consensus nodes. It some examples, a node can be both a process consensus node and a blockchain consensus node.

A smart contract when executed may implement a process that includes several stages or steps. The smart contract may specify that one of the stages includes obtaining consensus among process consensus nodes according to a consensus rule to approve an item (e.g., approve acceptance of a warehouse receipt). The smart contract may specify that after the consensus is reached among the process consensus nodes, a record of the voting results of the process consensus nodes is stored in a consortium blockchain. The consortium blockchain may be configured such that the record is stored in the consortium blockchain after consensus is reached among blockchain consensus nodes.

Figure 3:
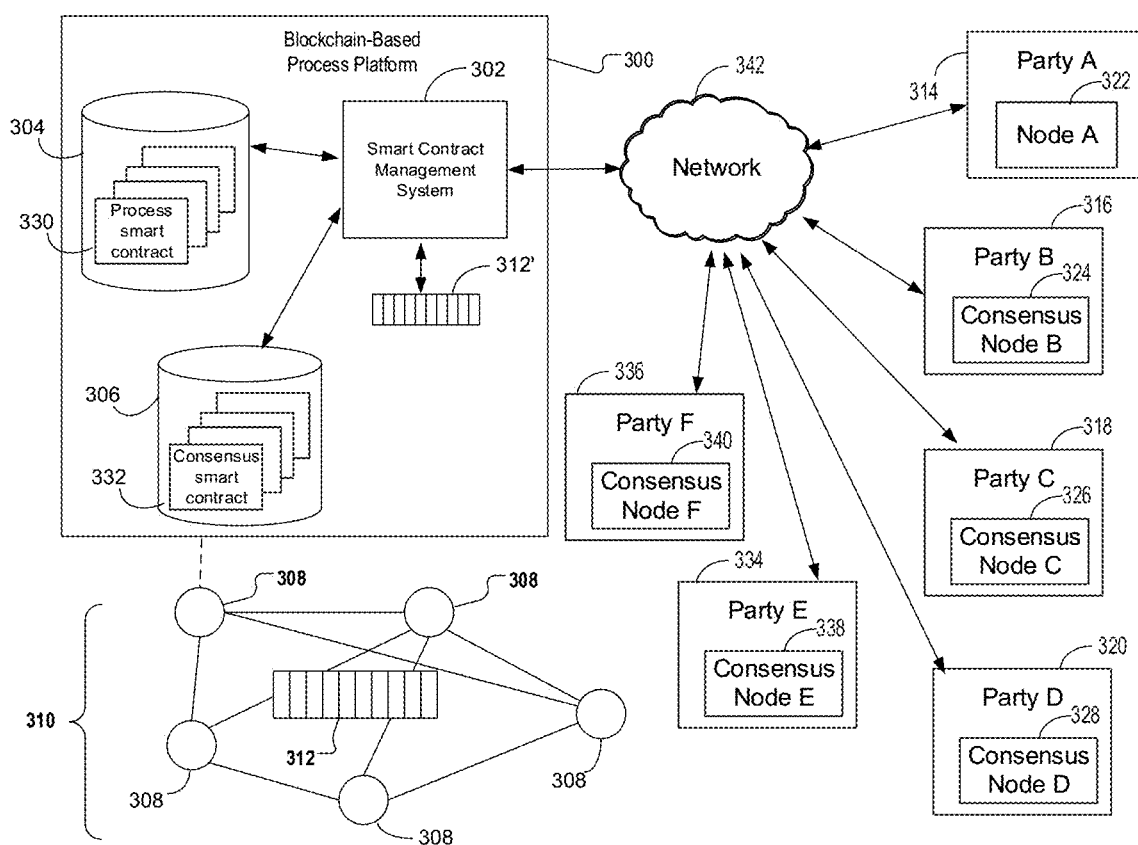
FIG. 3 is a diagram of an example of a blockchain-based process platform that enables users to manage smart contracts that facilitate implementing processes associated with projects of the users.

Referring to FIG. 3, a blockchain-based process platform 300 enables users to manage smart contracts that facilitate implementing processes associated with projects of the users. The process platform 300 includes a smart contract management system 302, a database 304 of process smart contracts 330, and a database 306 of consensus smart contracts 332. The smart contract management system 302 is configured to execute one or more of the process smart contracts 330, each of which may call one or more of the consensus smart contracts 332 to perform process consensus. The smart contract management system 302 can be associated with one of several nodes 308 of a blockchain network 310 in which a blockchain 312 is replicated across the blockchain network 310, and the blockchain 312' maintained by the smart contract management system 302 is a copy of the blockchain 312.

The blockchain-based process platform 300 provides smart contract management services to the users, such as party A 314, party B 316, party C 318, party D 320, party E 334, and party F 336. The users can access the process platform 300 through a network 342, such as the Internet. In this example, party A 314 has a node A 322, which can be a computer device controlled by party A 312. Node A 322 is configured to communicate with the smart contract management system 302, and can initiate execution of smart contracts at the blockchain-based process platform 300 or respond to requests from the smart contracts. Similarly, party B 316, party C 318, party D 320, party E 334, and party F 336 have a node B 324, node C 326, node D 328, node E 338, and node F 340 respectively. Each of the node B 324, node C 326, node D 328, node E 338, and node F 340 can be a computer device controlled by party B 316, party C 318, party D 320, party E 334, and party F 336, respectively, is configured to communicate with the smart contract management system 302, and can initiate execution of smart contracts at the process platform 300 or respond to requests from the smart contracts. In this example, node B 314, node C 326, node D 328, node E 338, and node F 340 participate in a consensus process and are referred to as consensus nodes.

For example, party A is a merchant who wishes to use goods stored at a warehouse as collateral to obtain loans from party B, party C, and party D, which are banks. Party E and party F are insurance companies that provide insurance for the goods. The merchant sends a warehouse receipt to the banks and the insurance companies as proof that the goods have been received by the warehouse. The merchant sends a warehouse receipt to the banks and the insurance companies as proof that the goods have been received by the warehouse, and requests confirmation of acceptance of the warehouse receipt and approval of distributing funds from the loan to the merchant. A process smart contract 330 and a consensus smart contract 332 can facilitate the process of coordinating with the banks and the insurance companies. For example, the process smart contract 330 upon execution obtains a warehouse receipt from a warehouse, and calls the consensus smart contract 332, passing the warehouse receipt from the process smart contract 330 to the consensus smart contract 332. The consensus smart contract 332 sends requests for approval to consensus nodes representing the banks and the insurance companies, in which the requests include the warehouse receipt so that the banks and the insurance companies can review the warehouse receipt. At each of the consensus nodes, a human operator or a business system reviews the request sent from the consensus smart contract 332, and generates a vote to approve or reject the request. In some examples, the consensus node may not respond within a preset time limit (e.g., because the human operator is too busy to respond), the consensus smart contract 332 may determine a vote for the consensus node based on default rules described in more detail below. The consensus smart contract 332 collects votes from the consensus nodes, and determines whether a consensus to approve the warehouse receipt has been reached according to one or more consensus rules.

In some examples, the parties A to F are also participant nodes 308 of the blockchain network 310, and each of the parties A to F maintains a copy of the blockchain 312. When the parties A to F participate in a project, data related to the project are stored in the blockchain 312 that can be viewed by all the parties A to F.

Figure 4:
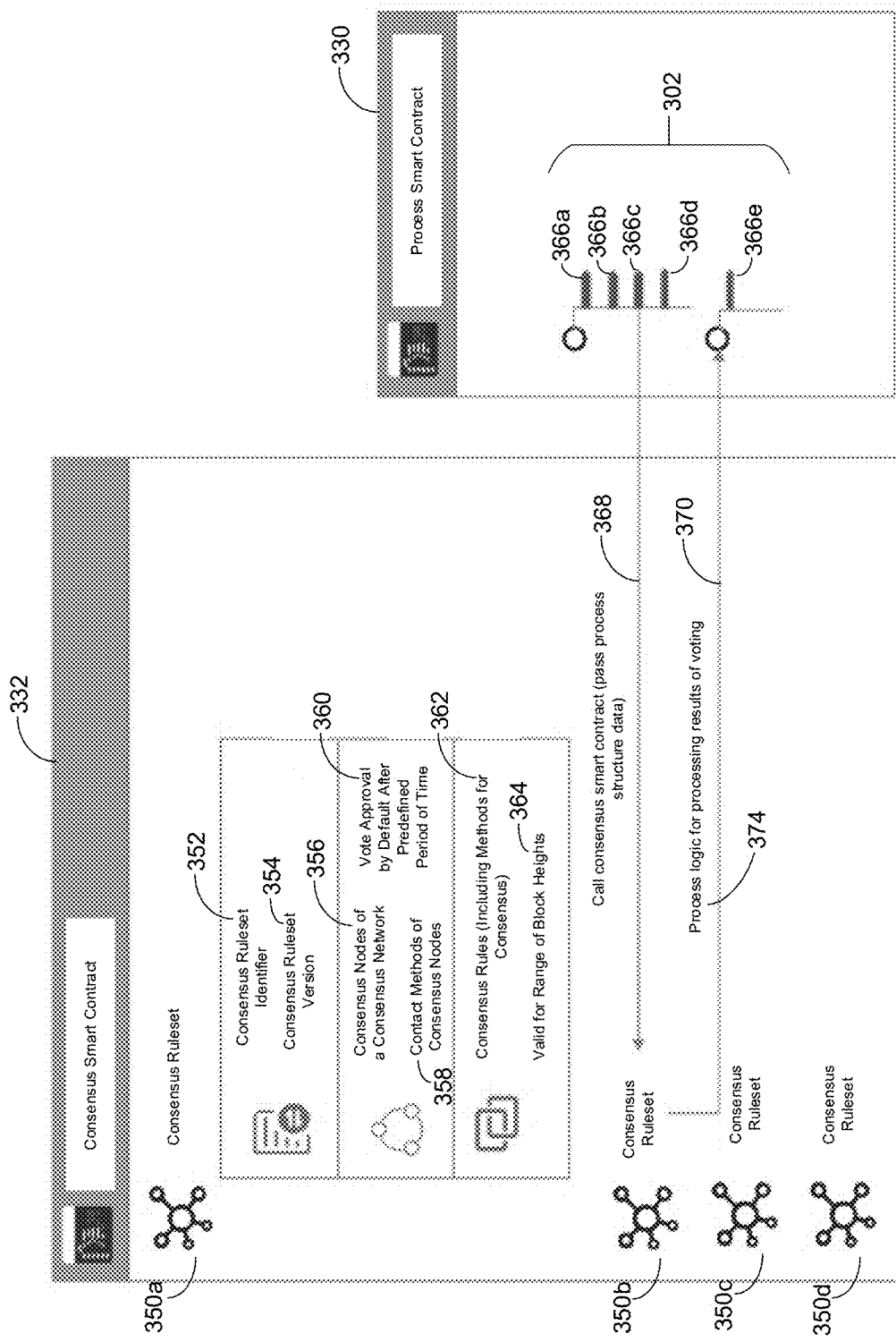
FIG. 4 is a diagram of an example of the data structure of a consensus smart contract, and the relationship between the consensus smart contract and a process smart contract.

FIG. 4 shows an example of the data structure of a consensus smart contract 332, and the relationship between the consensus smart contract 332 and a process smart contract 330. The consensus smart contract 332 can include one or more consensus rule sets, e.g., 350*a*, 350*b*, 350*c*, 350*d* (collectively referenced as 350). In some implementations, each consensus node, upon receiving a request to vote on an item, can vote approve, reject, or blank (which is equivalent to abstain from voting). Each consensus ruleset 350 can include some or all of the following information:

Consensus ruleset identifier 352.

Consensus ruleset version 354. In some implementations, the newest version of the consensus ruleset is effective, and the older versions become ineffective. For example, the consensus smart contract 332 can be stored in a blockchain, and the consensus smart contract 332 can be revised by adding a new version of the consensus rule set. The older versions of the consensus ruleset remain in the consensus smart contract 332 and become ineffective.

Consensus nodes of a consensus network 356. This is a list of the consensus nodes that need to be contacted in order to determine consensus.

Contact methods of consensus nodes 358. This indicates how each of the consensus nodes should be contacted, such as by short messaging services (SMS), e-mail, or system calls.

Information 360 about how to process a vote from a consensus node if the consensus node does not respond to a request after a predefined period of time. For example, the consensus ruleset 350 may specify that if a first consensus node does not respond to a request after a predefined period of time (e.g., 1 hour), the first consensus node is considered to vote approval by default. The consensus ruleset 350 may specify that if a second consensus node does not respond to a request after a predefined period of time, the second consensus node is considered to abstain from voting by default. The consensus ruleset 350 may specify that an active response is required from a third consensus node, i.e., a consensus cannot be reached unless the third consensus node sends an approval vote.

One or more consensus rules 362. The consensus rules 362 specify how consensus is determined. For example, a consensus rule may specify that consensus is reached if more than two-thirds (⅔) of the consensus nodes vote approval.

Conditions 364 for the consensus ruleset 350 or the consensus smart contract 332 to be valid. For example, the consensus ruleset 350 may specify that the ruleset 350 is valid only within certain date ranges or block height ranges.

The process smart contract 330 can implement a process 372 that includes several stages or steps, e.g., 366*a*, 366*b*, 366*c*, 366*d*, and 366*e*, collectively references as 366. In this example, one stage 366*c* includes a request for consensus. At the stage 366*c*, the process smart contract 330 calls 368 the consensus smart contract 332 and passes process structure data to the consensus smart contract 332. The process structure data includes data that need to be processed by the consensus smart contract 332 or the consensus nodes in order to determine consensus. The consensus smart contract 332 identifies the newest version of the consensus ruleset using the consensus rule version information 354, verifies that the time period and/or block height are/is within the range(s) specified in the conditions 364, communicates with the consensus nodes of the consensus network 356 using the contact method of the consensus nodes 358, collects the votes from the consensus nodes, taking into account of the default voting if not receive response within a predetermined period of time 360, and determines whether a consensus is reached according to the consensus rules 362. The consensus rules 362 represent a process logic for processing the results of the voting by the consensus nodes. The result of the determination of whether a consensus is reached is returned 370 to the process smart contract 330.

For example, a first consensus rule may specify that a consensus is reached only if all parties in a predefined set of parties give approval. For example, the predefined set of parties may include a predefined set of banks, and the first consensus rule may specify that a consensus is reached only if all banks in the predefined set of banks give approval. For example, a first business process may specify that a certain amount of funds shall be provided to company A if consensus is reached. If the first consensus rule is used for obtaining consensus, then the funds shall be provided to company A if all banks in the predefined set of banks give approval.

In the example above, a first business smart contract may specify that if consensus is reached according to the consensus rule specified in a first consensus smart contract, the funds shall be provided to company A. The first consensus smart contract may specify that consensus is reached if approval is obtained from all consensus nodes representing all banks in the predefined set of banks, by either receiving a vote of approval or obtaining approval by default from each of the consensus nodes. The approval by default is described in more detail below.

Variations of the first consensus rule may specify different predefined sets of parties. For example, a first variation of the first consensus rule may specify that a consensus is reached only if all banks in a first predefined set of banks (e.g., Bank A, Bank B, and Bank C) give approval, and a second variation of the first consensus rule may specify that a consensus is reached only if all banks in a second predefined set of banks (e.g., Bank A, Bank B, and Bank D) give approval, and so forth. A first variation of the first consensus smart contract may specify that a consensus is reached only if all consensus nodes representing all banks in a first predefined set of banks (e.g., Bank A, Bank B, and Bank C) give approval, and a second variation of the first consensus smart contract may specify that a consensus is reached only if all consensus nodes representing all banks in a second predefined set of banks (e.g., Bank A, Bank B, and Bank D) give approval, and so forth.

For example, a second consensus rule may specify that a consensus is reached if more than a predetermined percentage of parties in the predefined set of parties give approval. For example, the second consensus rule may specify that a consensus is reached only if more than 50% of the banks in the predefined set of banks give approval. In the first business process example above, if the second consensus rule is used for obtaining consensus, then the funds shall be provided to company A if more than 50% of the banks in the predefined set of banks give approval.

In the example above, a second consensus smart contract may specify that consensus is reached if approval is obtained from more than 50% of the consensus nodes representing the banks in the predefined set of banks, by either receiving a vote of approval or obtaining approval by default from each of the consensus nodes.

Variations of the second consensus rule may specify different percentage thresholds. For example, a first variation of the second consensus rule may specify that a consensus is reached only if at least two-thirds (⅔) of all banks in a predefined set of banks give approval, and a second variant of the second consensus rule may specify that a consensus is reached only if at least one-third (⅓) of the banks in the predefined set of banks give approval, and so forth. A first variation of the second consensus smart contract may specify that a consensus is reached only if approval is received from at least two-thirds (⅔) of the consensus nodes representing the banks in the first predefined set of banks, and a second variation of the second consensus smart contract may specify that a consensus is reached only if at least one-third (⅓) of all consensus nodes representing the banks in the second predefined set of banks (e.g., Bank A, Bank B, and Bank D), by either receiving a vote of approval or obtaining approval by default from each of the consensus nodes.

For example, a third consensus rule may specify that, after a party receives a request for approval, if the party does not respond with a disapproval or abstention message within a predetermined amount of time, the party will be considered to have given approval by default. For example, the third consensus rule may specify that by default an approval is given if the party does not respond with a disapproval or abstention message within 48 hours. In the first business process example, if the third consensus rule is used for obtaining consensus from a predefined set of banks, then the funds shall be provided to company A if each of the banks either give approval or not respond within 48 hours. A third consensus smart contract may specify that a consensus is reached if, for each of the banks in the predefined set of banks, approval is received from the consensus node representing the bank, or no response is received within 48 hours of receipt of request for approval from the consensus node representing the bank.

For example, a fourth consensus rule may specify that, after a party receives a request for approval, if the party does not respond with an approval or disapproval message within a predetermined amount of time, the party will be considered to have abstained from voting by default. For example, the fourth consensus rule may specify that by default a blank vote (abstention) is given if the party does not respond within 48 hours. In the first business process example, if the fourth consensus rule is used for obtaining consensus from a predefined set of banks, then a particular bank shall be deemed to have abstained from voting if the particular bank does not respond within 48 hours.

Variations of the third and fourth consensus rule may specify different time limits. For example, a variation of the third consensus rule may specify that a party gives approval by default if no response is provided by the party within five business days, and a variation of the fourth consensus rule may specify that a party is deemed to have abstained from voting by default if no response is provided by the party within five business days.

The consensus rules can involve algorithms and/or mathematical computations. Depending on the business processes, the algorithms and/or the mathematical computations can be complex. Further, multiple types of consensus rules can be combined.

For example, a fifth consensus rule may specify that a consensus is reached if all parties in a first set of predefined parties give approval, and at least a predetermined percentage of parties in a second set of predefined parties give approval, in which a party in a third set of predefined parties is deemed to have given approval if no response is provided by the party within a first predetermined amount of time, and a party in a fourth set of predefined parties is deemed to have abstained from voting if no response is provided by the party within a second predetermined amount of time.

The consensus rules may involve conditional logic. For example, a sixth consensus rule may specify that a consensus is reached if at least two-thirds (⅔) of the parties in a first set of predefined parties votes approval, and if less than two-thirds (⅔) of the parties in the first set of predefined parties votes approval, then a consensus is reached if all of the parties in a second set of predefined parties votes approval. The sixth consensus rule may specify that party A approves a request by default after 1 hour of receipt of the request, and that party B abstains from voting by default after 2 hours of receipt of the request.

The consensus rules may involve Boolean logic. For example, a seventh consensus rule may specify that a consensus is reached if at least one-third (⅓) of the parties in a first set of predefined parties votes approval, and also at least one of the parties in a second set of predefined parties votes approval. For example, an importer may wish to use imported goods as collateral for a loan. The importer may deposit goods at a warehouse and use the warehouse receipt to apply for the loan from a group of banks. An agreement between the importer, the group of banks, and a group of insurance agencies may specify that if the warehouse receipt is approved by at least two-thirds (⅔) of the banks in the group of banks and at least one insurance agency, then the fund from the loan shall be released and distributed to the importer. A business smart contract may specify that if the warehouse receipt is approved based on a consensus rule specified in a consensus smart contract, then the fund from the loan shall be released and distributed to the importer. The consensus smart contract can specify that a consensus is reached if approval is given by at least two-thirds (⅔) of the banks in the group of banks and at least one insurance agency.

In some implementations, the consensus nodes 356 can be a function of one or more parameters. For example, a consensus ruleset may specify that the consensus nodes for reaching a consensus depends on the time of the day. For example, a global bank may have branch offices in many countries spanning many time zones. In order to improve the speed of decision making, the consensus ruleset is designed so that the request for approval is sent to selected consensus nodes that represent branch offices that are open and can process the request. For example, if a request for approval of a loan is sent at UTC 2 pm, the request for approval can be sent to consensus nodes representing branch offices in, e.g., London and New York, but not to consensus nodes representing branch offices in, e.g., Beijing and Tokyo.

In some implementations, some of the consensus logic can reside in the process smart contract 330. For example, a first consensus smart contract 332 may specify consensus nodes that represent banks in the same time zone as Beijing, a second consensus smart contract 332 may specify consensus nodes that represent banks in the same time zone as San Francisco, a third consensus smart contract 332 may specify consensus nodes that represent banks in the same time zone as New York, and a fourth consensus smart contract 332 may specify consensus nodes that represent banks in the same time zone as London. Depending on when the request for approval of a loan is sent out, the process smart contract 330 can invoke the first, second, third, or fourth consensus smart contract. For example, if a request for approval for a loan is sent at UTC 2 pm, the process smart contract 330 may call the third or fourth consensus smart contact, and not call the first or second consensus smart contract.

Different parties that participate in the consensus process may have different operating schedules. For example, different banks in different countries have different holiday schedules. A consensus ruleset may specify that depending on the day that a request for approval of a loan is sent, the consensus nodes are selected such that the selected consensus nodes represent banks that are open on that day.

A consensus ruleset can include many sub-rules. For example, suppose an importer wishes to use goods stored at a warehouse as collateral for a loan. A consensus ruleset can be designed with the following consensus logic:

Assume value of goods is X, loan amount is Y;
If Y is less than 10% of X, then use consensus rule 1;
If 10%*X≤Y≤30%, then use consensus rule 2;
If 30%*X≤Y≤50%, then use consensus rule 3; and
If 50%*X≤C Y≤80%, then use consensus rule 4.

Consensus rule 1: A consensus is reached if at least one (1) insurance company votes approval, at least 10% of banks vote approval, and a bank is deemed to vote approval if it does not respond within one (1) business day;

Consensus rule 2: A consensus is reached if at least one (1) insurance company votes approval, at least 30% of banks vote approval, and a bank is deemed to abstain from voting if it does not respond within one (1) business day;

Consensus rule 3: A consensus is reached if at least one (1) insurance company votes approval, and at least 50% of banks vote approval; and Consensus rule 4: A consensus is reached if at least one (1) insurance company votes approval, and all banks vote approval.

For example, consensus rules can include conditions that are functions of other parameters. As an illustration, suppose an importer wishes to use goods stored at a warehouse as collateral for a loan. A consensus ruleset can be designed with the following consensus logic:

Assume value of goods is X, loan amount is Y,
If Y is less than Z % of X, then use consensus rule 1, and
If Z %*X≤Y≤2*Z %, then use consensus rule 2.
Z is a function of the importer's credit score (and optionally other parameters, such as other assets).

Consensus rule 1: A consensus is reached if at least one (1) insurance company votes approval, and at least P1% of banks vote approval.

Consensus rule 2: A consensus is reached if at least one (1) insurance company votes approval, and at least P2% of banks vote approval.

P1 and P2 are functions of Z.

In some implementations, the system uses a feedback loop or machine learning to determine the values of the parameters used in consensus rules, such as the parameters Z, P1, and P2 in the above example. For example, a function F can represent the banks' performance in terms of profitability, risk, and quality of service in providing loans, and the system can adjust the parameters Z, P1, and P2 over time in order to maximize F. For example, a global bank can have hundreds or thousands of branch offices in countries around the world, and each branch office can participate in projects around the world and participate in the consensus for the projects. The global bank can use the techniques disclosed in this specification to implement an efficient loan approval process. Because there are many choices for the selection of consensus nodes for each loan project, the global bank can use the feedback loop or machine learning to optimize the consensus rules, including the selection of branch offices and other parameters for the consensus process.

The consensus smart contracts 332 can be used to facilitate consensus processes for many types of projects. For example, a global company has employees in branch offices across many countries work on a project that requires all expenses to be pre-approved by a finance team that includes individual team members located in different branch offices in different countries. A process smart contract 330 can implement the business logic for handling expense requests, and a consensus smart contract 332 can facilitate the consensus process regarding whether to approve the expenses. For example, when an employee sends a request for approval of an expense to the process smart contract 330, the process smart contract 330 calls the consensus smart contract 332 and sends information about the expense request to the consensus smart contract 332. The consensus smart contract 332 sends a request for approval to the consensus nodes representing the team members of the finance team responsible for approving the expenses. The consensus smart contract 332 determines whether a consensus is reached to approve the expense according to the consensus rules 362, and returns the result to the process smart contract 330, which in turn informs the employee whether the expense has been approved.

By using the process smart contract 330 and the consensus smart contract 332, the global company can have a clear record of how the expenses are approved. For example, the consensus smart contract 332 records the voting results in a blockchain so that later it is easy to determine who approved or declined each expense request.

For example, a construction company may work on a construction project for building a skyscraper that includes many stages in which an earlier stage needs to be approved before a subsequent stage can start. After the foundation of a building is finished, the foundation needs to be inspected for structural integrity before construction workers can install the beams and frames of the building. After the beams and frames for the first floor are installed, the first floor needs to be inspected for structural integrity before the beams and frames for the second floor are installed, and so forth. The construction company may employ a few human inspectors and a large number of robotic inspectors. For example, the robotic inspectors can include drones that fly around the construction site and use various sensors to make measurements on several parameters.

A process smart contract 330 can implement an inspection process, and a first consensus smart contract 332 can implement the process for obtaining consensus from the human inspectors and the robotic inspectors for inspecting the foundation. For example, upon completion of the building foundation, the process smart contract 330 calls the first consensus smart contract 332, which sends a request for approval of the building foundation to the consensus nodes representing the human inspectors and the robotic inspectors. For example, some of the consensus nodes can be tablet computers that the human inspectors carry with them at the construction site. Some of the consensus nodes can be computers integrated with the robotic inspectors, or computers that are wirelessly linked with the robotic inspectors and process the measurements transmitted from the robotic inspectors.

Using an interface on the tablet computers, the inspectors send their votes of approval or disapproval for the building foundation to the first consensus smart contract 332. Similarly, the robotic inspectors send their votes to the first consensus smart contract 332 through wired or wireless communication links. The first consensus smart contract 332 determines whether a consensus has reached based on the consensus rules 362. For example, the consensus rules 362 may specify that approval votes must be received from all human inspectors, and approval votes must be received from at least 90% of the robotic inspectors, in order to reach consensus. The consensus smart contract 332 returns the consensus processing result to the process smart contract 330, which informs the construction team whether they can go ahead and install the first floor beams and frames, or need to rework on the foundation.

A second consensus smart contract 332 can implement the process for obtaining consensus from the human inspectors and the robotic inspectors for inspecting the first floor. For example, the robotic inspectors for inspecting the first floor can be different from the robotic inspectors for inspecting the foundation. Thus, the consensus nodes 356 in the first consensus smart contract 332 can be different from the consensus nodes 356 in the second consensus contract. Upon completion of the frames and beams for the first floor, the process smart contract 330 calls the second consensus smart contract 332, which determines whether a consensus is reached for approving the first floor using a process similar to that for the foundation. By using the process smart contract 330 and the consensus smart contracts 332, the construction company can have a clear record of the approval process for the construction project, including which inspectors gave the approvals at each stage of the project.

For example, a manufacturing plant can implement an assembly line for producing products, in which the assembly line has two or more checkpoints that evaluate whether the components of the products have been installed properly. At each checkpoint, two or more inspectors evaluate the products. The inspectors can include human inspectors and several types of robotic inspectors (e.g., robots having various sensors that can make various measurements). For example, a first type of robotic inspectors may inspect the products for safety issues, and a second type of robotic inspectors may inspect the products for cosmetic issues. Each inspector can vote "pass," "fail," or "not inspected." For example, a first checkpoint may require at least one human inspector to vote "pass," no human inspector to vote "fail," at least 90% of the first type of robotic inspectors vote "pass," no first type robotic inspector votes "fail," at least 75% of the second type of robotic inspectors vote "pass," and not more than 10% of the second type of robotic inspectors vote "fail." In this example, safety of the product is important, so there cannot be a "fail" vote on safety issues, whereas a small percentage of cosmetic problems is acceptable.

A process smart contract 330 can implement an inspection process, and a first consensus smart contract 332 can implement the process for obtaining consensus from the human inspectors and the robotic inspectors for inspection at the first checkpoint. For example, upon a partially assembled product reaching the first checkpoint, the process smart contract 330 calls the first consensus smart contract 332, which sends a request for approval of the partially assembled product to the consensus nodes representing the human inspectors and the robotic inspectors. For example, some of the consensus nodes can be tablet computers that the human inspectors carry with them at the factory. Some of the consensus nodes can be computers integrated with the robotic inspectors, or computers that are wirelessly linked with the robotic inspectors and process the measurements transmitted from the robotic inspectors.

Using an interface on the tablet computers, the inspectors send their votes of "pass," "fail," or "not inspected" to the first consensus smart contract 332. Similarly, the robotic inspectors send their votes to the first consensus smart contract 332 through wired or wireless communication links. The first consensus smart contract 332 determines whether a consensus has reached based on the consensus rules 362. In the example above, at least one "pass" vote must be received from a consensus node representing a human inspector, no "fail" vote can be received from a consensus node representing a human inspector, "pass" votes must be received from at least 90% of the consensus nodes representing the first type of robotic inspectors, no "fail" vote can be received from a consensus node representing the first type robotic inspector, "pass" votes must be received from at least 75% of the consensus nodes representing the second type of robotic inspectors, and "fail" votes cannot be received from more than 10% of the second type of robotic inspectors. The consensus smart contract 332 returns the consensus processing result to the process smart contract 330, which informs the assembly line whether the product can continue down the assembly line or needs to be removed or reworked.

A second consensus smart contract 332 can implement the process for obtaining consensus from the human inspectors and the robotic inspectors for inspection at a second checkpoint, and so forth. By using the process smart contract 330 and the consensus smart contracts 332, the manufacturing company can have a clear record of the approval process for each product, including which inspectors gave the approvals at each checkpoint of the assembly line.

In some embodiments, the database 306 (FIG. 3) can include consensus smart contracts that are provided as a kit or a library in which the user can incorporate the individual consensus smart contracts into process contracts without knowing the details of how the consensus smart contracts are written. The consensus smart contracts in the kit or library can form "building blocks" that can be combined to provide a more complex tailor-made solution for an application. For example, a first consensus smart contract can be configured to implement a first consensus ruleset and can be invoked by calling a getConsensus1( ) function, a second consensus smart contract can be configured to implement a second consensus ruleset and can be invoked by calling a getConsensus2( ) function, and a third consensus smart contract can be configured to implement a third consensus ruleset and can be invoked by calling a getConsensus3( ) function, and so forth. For example, an application that involves complex consensus logic that incorporates the first, second, and third consensus rulesets can be implemented by using a combination of getConsensus10, getConsensus2( ) and getConsensus30 functions.

In some embodiments, the process smart contract 330 executes on a first blockchain, and the consensus smart contract 332 executes on a second blockchain. In some examples, the first and the second blockchains are the same blockchain. In some examples, the first blockchain is different from the second blockchain.

Figure 5:
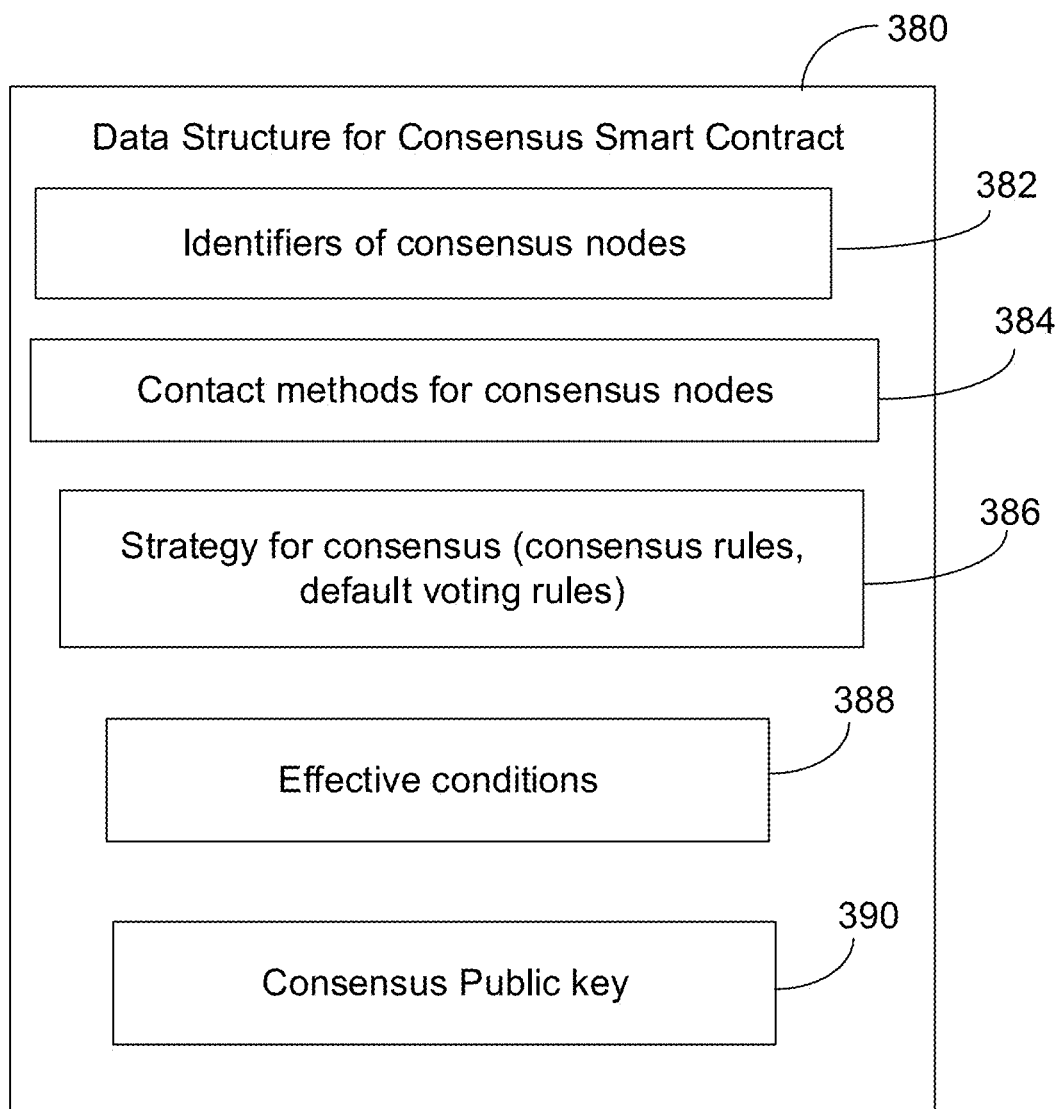
FIG. 5 is a diagram of an example of the data structure for a consensus smart contract.

FIG. 5 shows an example of the data structure for a consensus smart contract. A consensus smart contract 380 includes the following information:

Identifiers of consensus nodes 382.
    Example: "node1, node2, nodeN."
Contact methods for consensus nodes 384.
    Example: "node1[SMS, email, sysCall], node2[SMS], node3[sysCall], . . . , nodeN[SMS, sysCall]."
    In this example, node1 can be contacted using SMS, e-mail, and system call; node2 can be contacted using SMS, node3 can be contacted using system call, and nodeN can be contacted using SMS and system call.
    If a consensus node can be contacted through short messaging service, the "contact method" information 384 includes the designated SMS phone number for the consensus node. If a consensus node can be contacted through e-mail, the "contact method" information 384 includes the designated e-mail address(es) of the consensus node for receiving messages from the consensus smart contract 380.
    For example, the consensus node node1 and the consensus smart contract can belong to the same platform, system, or network (e.g., blockchain platform, system, or network), which provides the application programming interface (API) that enables the consensus smart contract to contact the consensus node node1 through system calls. The "contact method" information 384 includes the URL of the consensus node and relevant system call parameters.

Strategy for consensus 386, including consensus rules and default voting rules. The consensus rules specify how a consensus is reached. The default voting rules specify how to handle votes from consensus node that do not respond within a predetermined period of time, such as whether a consensus node is deemed to vote approval, disapproval, or blank (abstain from voting) by default.
    Example consensus rule 1: "Approval from 100% consensus nodes." In this example, reaching consensus requires all consensus nodes to vote approval.
    Example consensus rule 2: "Approval from ⅔ consensus nodes." In this example, reaching consensus requires at least two-thirds (⅔) of the consensus nodes to vote approval.
    Example consensus rule 3: "Approval from designated nodes." In this example, reaching consensus requires designated consensus nodes (e.g., node1, node4, node10) to vote approval. In this example, if one of the designated consensus nodes votes disapproval, then consensus fails even if all other consensus nodes vote approval.
    Example default voting rule 1: "node1 [approve by default after 2 hours], node2[abstain from voting by default after 1 hour]." In this example, if node1 does not respond in 2 hours after receiving a request for voting, the consensus smart contract will consider node1 to have voted approval by default. If node2 does not respond within 1 hour after receiving a request for voting, the consensus smart contract will consider node2 to abstain from voting.

Effective conditions 388, e.g., "effective at block height 10000, ineffective at block height 99999." In this example, the consensus smart contract 380 can be called and executed starting at block height 10000, and at block height 99999 the consensus smart contract 380 becomes ineffective and cannot be called. The conditions for consensus smart contract being effective 388 can also be based on date and/or time, such as "effective at date X, in effective at date Y."

Consensus public key 390.
    Each consensus smart contract has a corresponding public key infrastructure. The public key is stored in the consensus smart contract 380 and can be downloaded by the consensus nodes. One or more private keys associated with the consensus smart contract are stored in, e.g., the key management system of the blockchain on which the consensus smart contract is executed.

Each consensus node has a corresponding public key infrastructure, in which the consensus node stores a public key in a blockchain, and the public key can be downloaded by the consensus smart contract. The consensus node has a corresponding private key.

Only the consensus smart contract can digitally sign documents or messages using the private keys of the consensus smart contract. This ensures that the requests for approval sent to the consensus nodes are actually from the consensus smart contract.

The following describes an example of how each consensus node can securely send a message that includes its vote to the consensus smart contract. The consensus node generates a message that includes its vote, uses the public key of the consensus smart contract to encrypt the message, uses its private key (of the consensus node) to digitally sign the encrypted message that includes the vote, then sends the digitally signed encrypted message to the consensus smart contract. The consensus smart contract downloads the public key of the consensus node from the blockchain where the public key is stored, uses the public key of the consensus node to verify that the message is indeed from the consensus node, and uses the private key of the consensus smart contract to decrypt the encrypted message to obtain the plaintext of the vote. This way, the vote from the consensus node cannot be tampered with.

In some examples, the parties that participate in a project form a consortium blockchain network, in which each party corresponds to a node of the consortium blockchain network, and data related to the project are stored in a blockchain maintained by the consortium blockchain network. Prior to using the consensus smart contract 380 to per perform consensus, the parties or the system participating in the consensus use the consensus public key 390 to verify that the consensus smart contract 380 is associated with the consortium blockchain network. This way, if a consensus smart contract from an unrelated third party sends messages to the consensus nodes, the consensus nodes will be able to detect that the messages are sent from unrelated third parties and should be ignored.

For example, the process smart contract 330 can invoke the consensus smart contract 332 by calling a function, such as "getConsensus (p1)" in which p1 represents a parameter such as "MasterData" data structure that is the data passed from the process smart contract 330 to the consensus smart contract 332. For example, the MasterData data structure can include the following information:

Process data or business data (data for the subject matter that requires consensus), such as warehouse receipt.

A table to be filled with votes and digital signatures of the consensus nodes. After the votes (approve, reject, abstain) and digital signatures are obtained from the consensus nodes, the consensus smart contract writes the votes and digital signatures into this table.

Effective time. This indicates the time period for which the consensus is effective. After the specified time period, the consensus smart contract 332 will not accept any more votes from the consensus nodes.

After the consensus smart contract 332 obtains the votes from the consensus nodes and determines whether a consensus has been reached, the consensus smart contract 332 returns the MasterData data structure to the process smart contract 330. The above are merely examples of the information that can be included in the data structure passed to and returned from the consensus smart contract 332. The consensus smart contract 332 can also include other information not shown above. In some examples, p1 can be a link to a data object that is an instance of the "MasterData" data structure or class. Thus, the process smart contract 330 can pass a data object (that includes the data for the subject matter that requires consensus) or a link to the data object to the consensus smart contract 332.

Figure 6:
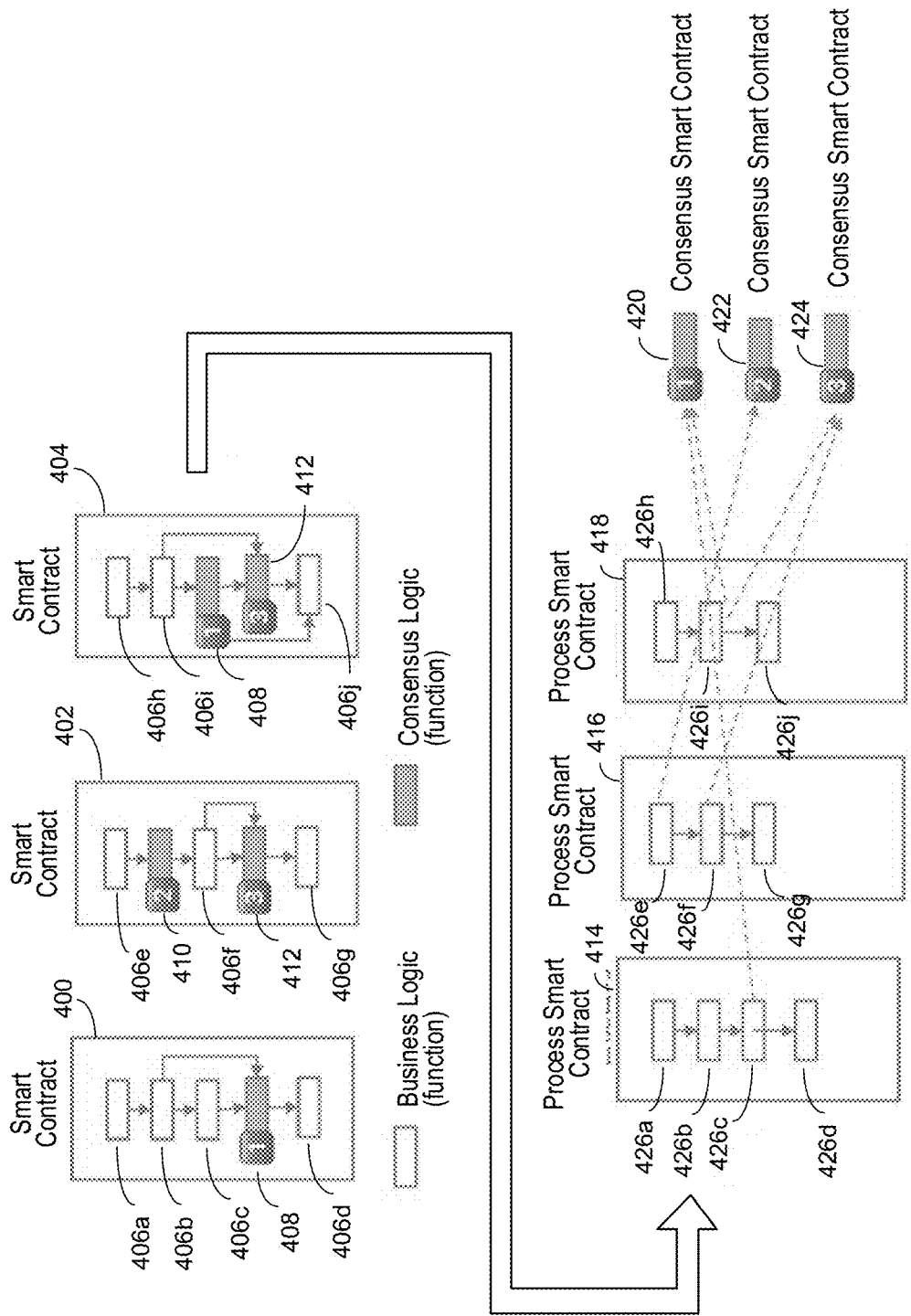
FIG. 6 is a diagram of examples of smart contracts.

FIG. 6 shows several examples of smart contracts and illustrates the benefits of the invention according to the techniques described in this specification. The left portion of the figure shows three examples of process smart contracts 400, 402, and 404 for implementing processes, e.g., business processes such as processes for using warehouse receipts to obtain loans, processes for monitoring construction projects, and processes for monitoring manufacturing production lines. The business logic for the business processes can be coded into the process smart contracts. Each process smart contract includes several modules for implementing the various stages or steps of the corresponding process. For example, the process smart contract 400 includes process modules 406*a*, 406*b*, 406*c*, a consensus module 408, and a process module 406*d*. The process modules 406*a*, 406*b*, 406*c*, and 406*d* can implement, e.g., various stages or steps in the process.

When the process requires a decision to be made by other parties, a consensus module is used to solicit votes from consensus nodes representing the other parties. For example, the consensus module 408 applies a first consensus ruleset, such as the consensus ruleset 350*a* of FIG. 4, sends requests for approval to relevant consensus nodes, collects votes from the consensus nodes, and determines a consensus result for a decision that needs to be made as part of the process. In this example, the outputs of the process module 406*c* are provided to the consensus module 408, which determines whether consensus is reached according to a first ruleset, and provides the result of the determination to the process module 406*d*.

The process smart contract 402 includes a process module 406*e*, a consensus module 410, a process module 406*f*, a consensus module 412, and a process module 406*g*. In this example, the outputs of the process module 406*e* are provided to the consensus module 410, which applies a second consensus ruleset, collects votes from relevant consensus nodes, determines whether consensus is reached, and provides the result of the determination to the process module 406*f* The outputs of the process module 406*f* are provided to the consensus module 412, which applies a third consensus ruleset, collects votes from relevant consensus nodes, determines whether a consensus is reached, and provides the result of the determination to the process module 406*g*.

The process smart contract 404 includes process modules 406*h* and 406*i*, consensus modules 408 and 410, and a process module 406*j*. In this example, the outputs of the process module 406*i* are provided to the consensus module 408, which applies the first consensus ruleset, collects the votes from relevant consensus nodes, determines whether consensus is reached, and provides the result of the determination to the consensus module 412. The consensus module 412 applies the third consensus ruleset, collects the votes from relevant consensus nodes, determines whether consensus is reached, and provides the result of the determination to the process module 406j. The process modules 406a to 406j are collectively referenced as 406.

In each of the process smart contracts 400, 402, 404, the process modules 406 follow a business logic to complete process steps, and the consensus modules (408, 410, 412) follow a consensus logic to determine consensus results. In this example, if the first consensus ruleset or the selection of consensus nodes associated with the first consensus ruleset needs to be modified, such that the consensus module 408 needs to be updated, both the process smart contract 400 and the process smart contract 404 need to be updated. If the third consensus ruleset or the selection of consensus nodes associated with the third consensus ruleset needs to be modified, such that consensus module 412 needs to be updated, both the process smart contract 402 and the process smart contract 404 need to be updated. If there is a large number of process smart contracts, any modification to a particular consensus ruleset necessitates modification of all the process smart contracts that uses the particular consensus ruleset. Because different smart contracts may be written by different people, keeping track of which process smart contracts uses which consensus rulesets may be difficult as the number of process smart contracts increases. There is a risk that some process smart contracts are not updated and that the consensus results are not appropriate because the consensus rulesets are outdated.

FIG. 6 on the right shows process smart contracts 414, 416, and 418, and consensus smart contracts 420, 422, and 424. The consensus modules 408, 410, and 412 have been separated from the process smart contracts and re-formatted as the consensus smart contracts 420, 422, and 424. The process smart contract 414 includes process modules 426a, 426b, 426c, and 426d. The process modules 426a, 426b, and 426d are similar to the process modules 406a, 406b, and 406d. The process module 426c implements a process logic or business logic similar to that of the process module 406c. Unlike the process module 406c that provides the output to the consensus module 408, the process module 426c is configured to call the consensus smart contract 420, which includes a similar consensus ruleset as the consensus module 408. The process module 426c can invoke the consensus smart contract 420 using a function call and pass a parameter such as "MasterData 1" to the consensus smart contract 420. The consensus smart contract 420 applies the first consensus ruleset, collects votes from relevant consensus nodes, determines whether a consensus is reached, and returns the result of consensus to the process module 426c.

The process smart contract 416 includes process modules 426e, 426f, and 426g. The process module 426g is similar to the process module 406g. The process modules 426e and 426f implement similar process logic or business logic as the process modules 406e and 406f. The process module 426e is configured to call the consensus smart contract 422, which includes the second consensus ruleset, similar to the consensus module 410. The process module 426e can invoke the consensus smart contract 422 using a function call, and pass a parameter such as "MasterData 2" to the consensus smart contract 422. The consensus smart contract 422 applies the second consensus ruleset, collects votes from relevant consensus nodes, determines whether a consensus is reached, and returns the result of consensus to the process module 426e.

The process module 426f is configured to call the consensus smart contract 424, which includes the third consensus ruleset, similar to that in the consensus module 412. The process module 426f can invoke the consensus smart contract 424 using a function call, and pass a parameter such as "MasterData 3" to the consensus smart contract 424. The consensus smart contract 424 applies the third consensus ruleset, collects votes from relevant consensus nodes, determines whether a consensus is reached, and returns the result of consensus to the process module 426f.

The process smart contract 418 includes process modules 426h, 426i, and 426j. The process modules 426h and 426j are similar to the process module 406h and 406j. The process module 426i implements a similar process logic or business logic as the process module 406i. The process module 426i is configured to call the consensus smart contract 420 and pass a parameter such as "MasterData 4" to the consensus smart contract 420, which applies the first consensus ruleset, collects votes from relevant consensus nodes, and returns the result of consensus to the process module 426i. The process module 426i then calls the consensus smart contract 424 and passes a parameter such as "MasterData 5" to the consensus smart contract 424, which applies the third consensus ruleset, collects votes from relevant consensus nodes, and returns the result of consensus to the process module 426i.

By separating the consensus smart contracts 420, 422, and 424 from the process smart contracts 414, 416, and 418, maintaining the process smart contracts becomes easier (as compared to maintaining the process smart contracts 400, 402, 404). When there are changes in the first consensus ruleset, or changes in the consensus nodes that are associated with the first ruleset, only the consensus smart contract 420 needs to be modified, and the process smart contracts 414 and 418 do not need to be modified. When there are changes in the third consensus ruleset, or changes in the consensus nodes that are associated with the third consensus ruleset, only the consensus smart contract 424 needs to be modified, and the process smart contracts 416 and 418 do not need to be modified. Furthermore, the process smart contracts 414, 416, 418 are shorter and easier to write compared to the corresponding process smart contracts 400, 402, 404, and the process smart contracts 414, 416, 418 may have fewer errors.

Figure 7:
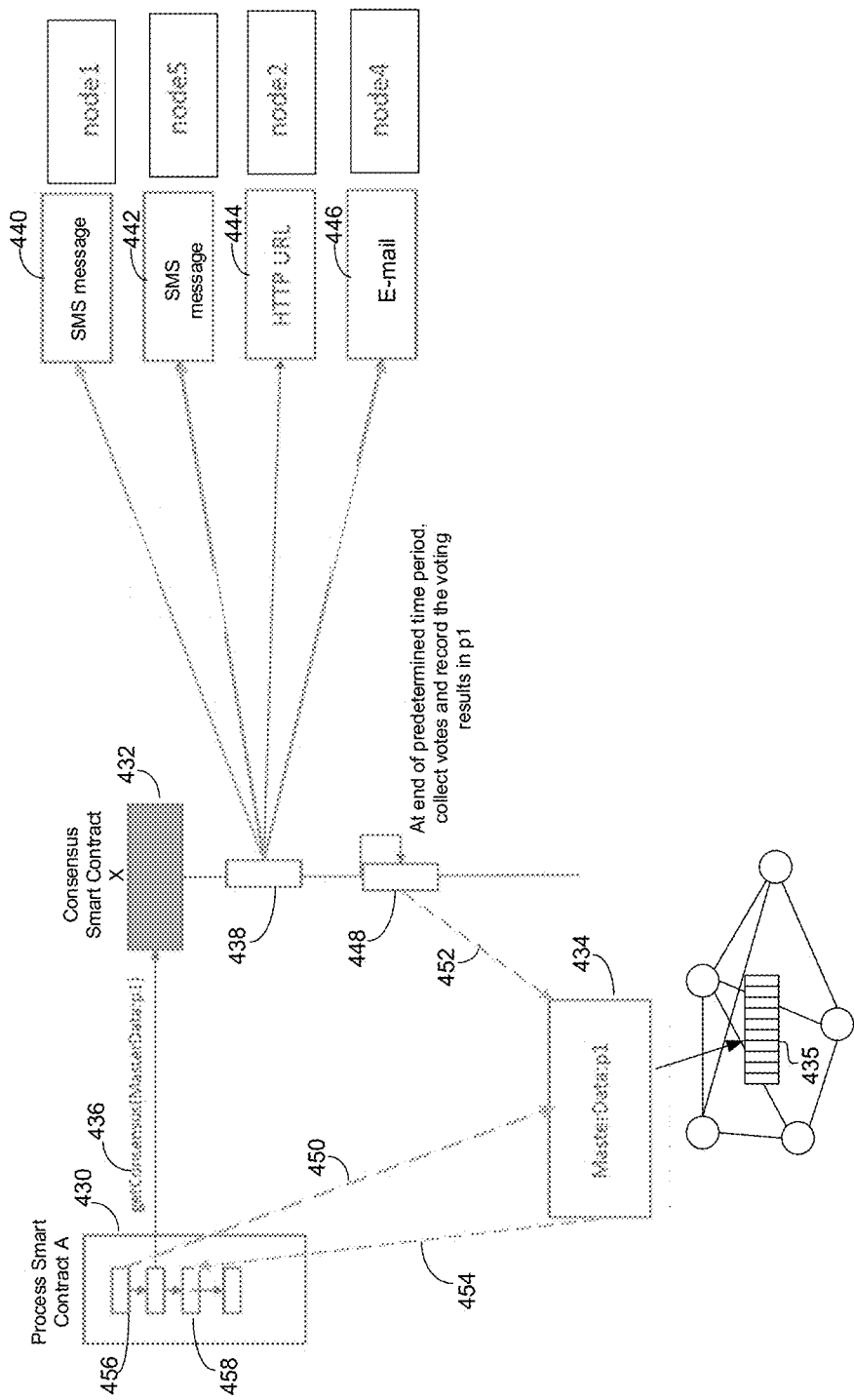
FIG. 7 is a diagram of an example of operations of a process smart contract and a consensus smart contract.

FIG. 7 is a diagram showing an example of the operations of a process smart contract 430 and a consensus smart contract 432. The data that is the subject of the consensus is stored in data object "MasterData:p1" 434 that is stored in a blockchain 435, and the hash values are stored in a Merkle tree structure. The notation "MasterData:p1" means that p1 is an instance or object of the MasterData data structure or class. To modify the data in the data object p1, new data is added to the data object, a new hash value is added to the Merkle tree, and the existing data object p1 is not erased. This preserves the voting records, prevents tampering of the records, and allows all parties to later verify the correctness of the consensus results.

For example, the messages exchanged between the consensus smart contract 432 and the consensus nodes can be encrypted using various encryption technologies, such as Data Encryption Standard (DES), TripleDES, RSA, Advanced Encryption Standard (AES), Twofish, etc.

In operation, the process smart contract 430 uses, e.g., a getConsensus(MasterData:p1) function call 436 to invoke the consensus smart contract 432 and pass the data object p1 to the consensus smart contract 432. At step 438 the consensus smart contract 432 sends an SMS message 440 to a consensus node node1, sends a SMS message 442 to a consensus node node5, contacts a consensus node node2 using a system call 444 to the HTTP URL address of the consensus node node2, and sends an e-mail message 446 to a consensus node node4. For example, the consensus smart contract 432 sends the contents of data object p2 to consensus nodes node1, node5, node2, and node4, and requests the consensus nodes to vote on whether to approve. At each of the consensus node, an operator (either a human or a business system) reviews the data provided by the consensus smart contract and generates a vote to approve or reject that subject matter that needs consensus. For example, a human operator or a business system reviews a warehouse receipt to determine whether to approve the warehouse receipt as valid proof that the goods have been properly stored at the warehouse. At step 448, the consensus smart contract 430 collects the votes from the consensus nodes, determines whether a consensus has been reached according to a consensus ruleset, and records the consensus result in the data object p1 that is stored in the blockchain.

The dashed line 450 indicates that a process module 456 of the process smart contract 430 generates the data object p1 434 of the MasterData class, the dashed line 452 indicates that the consensus smart contract 432 stores the result of consensus to the data object p1, and the dashed line 454 indicates that a process module 458 of the process smart contract 430 reads the data object p1 434.

In some examples, the process smart contract 430 passes p1 as a data object to the consensus smart contract 432, in which p1 is a data object that includes data for the subject matter that requires consensus. The consensus smart contract 432 writes the vote to the data object p1, and passes the data object p1 back to the process smart contract 430. In some examples, p1 is a link to a data record stored in the blockchain. For example, suppose the process smart contract 430 needs to obtain approval from the consensus nodes about a warehouse receipt. The process smart contract 430 uses getConsensus(MasterData:p1) to invoke the consensus smart contract 432. In some examples, p1 is a data object that includes the warehouse receipt. The process smart contract 430 sends the p1 data object that includes the warehouse receipt to the consensus smart contract 432. An operator, either a human or a business system, will review the warehouse receipt before making a vote. In some examples, the process smart contract 430 stores the warehouse receipt in a data record in the blockchain, sends the link (or address) of the data record to the consensus smart contract 432, and the consensus smart contract 432 writes the results of the consensus voting to the data record in the blockchain.

Figure 8:
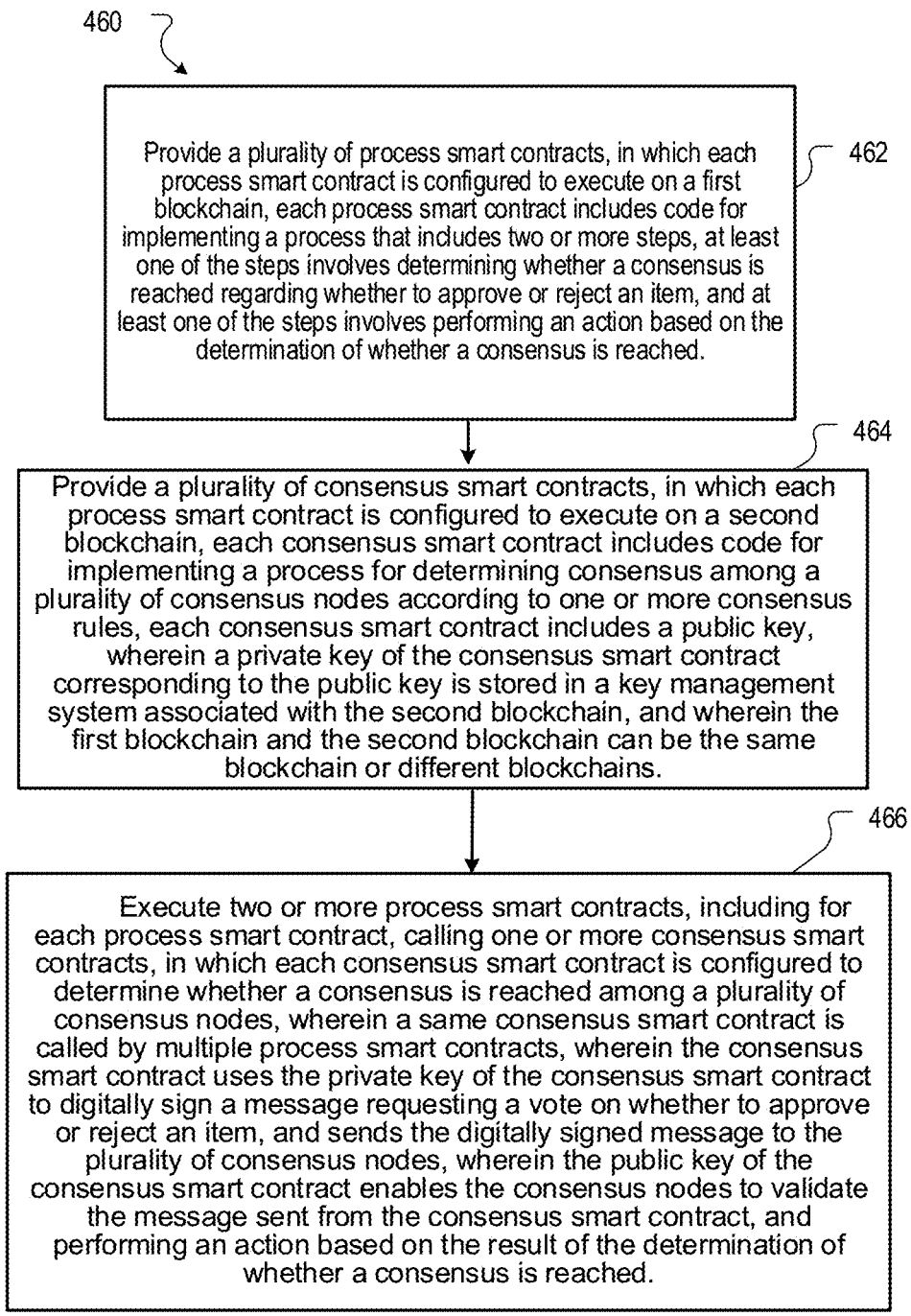

FIG. 8 is a flowchart of an example of a process 460 for implementing processes that include determining consensus among a plurality of consensus nodes. For convenience, the process 460 will be described as being performed by a system of one or more computers, located in one or more locations, and programmed appropriately in accordance with this specification. For example, a computing system, e.g., the computing system 106 or 108 of FIG. 1, appropriately programmed, can perform the process 460. The process 460 includes the following steps.

At 462, a plurality of process smart contracts is provided, in which each process smart contract is configured to execute on a first blockchain. Each process smart contract includes code for implementing a process that includes two or more steps. At least one of the steps involves determining whether a consensus is reached regarding whether to approve or reject an item, and at least one of the steps involves performing an action based on the determination of whether a consensus is reached.

In some embodiments, the computer system can be the blockchain-based process platform 300 (FIG. 3). The process smart contracts can be the process smart contracts 330 (FIGS. 3 and 4), 414, 416, 418 (FIG. 6), and 430 (FIG. 7). The two or more steps can be the steps 366*a*, 366*b*, 366*c*, 366*d*, 366*e* (FIG. 4), the steps 426*a*, 426*b*, 426*c*, 426*d*, the steps 426*e*, 426*f*, 426*g*, 426*h*, 426*i*, 426*j* (FIG. 6), and the steps that correspond to the process modules 456 and 458 (FIG. 7).

In some embodiments, one of the process smart contracts can be configured to implement a process related to using a warehouse receipt to apply for a loan using goods stored in the warehouse as collateral. For example, one of the process smart contracts can be configured to implement a process related to confirming that each milestone of a construction project has been met and obtaining approvals from banks to distribute payments to contractors. For example, one of the process smart contracts can be configured to implement a process related to confirming the worth of certain personal property of a user by an inspector and obtaining approvals from banks regarding a microloan of a certain amount based on the value of the personal property. For example, one of the process smart contracts can be configured to implement a process related to sending relevant information to relevant agencies and obtaining approvals from the agencies to issue certifications for a product made by a manufacturer.

At 464, a plurality of consensus smart contracts are provided, in which each process smart contract is configured to execute on a second blockchain. Each consensus smart contract includes code for implementing a process for determining consensus among a plurality of consensus nodes according to one or more consensus rules. Each consensus smart contract includes a public key, and a private key of the consensus smart contract corresponding to the public key is stored in a key management system associated with the second blockchain. The first blockchain and the second blockchain can be the same blockchain or different blockchains.

In some embodiments, the consensus smart contracts can be the consensus smart contacts 332 (FIGS. 3 and 4), 420, 422, 424 (FIG. 6), and 432 (FIG. 7). The consensus nodes can be the consensus node B 324, consensus node C 326, consensus node D 328, consensus node E 338, consensus node F 340 (FIG. 3), and consensus nodes node1, node2, node4, and node5 (FIG. 7). The one or more consensus rules can be the consensus rules 362 (FIG. 4).

In some embodiments, at least one of the consensus smart contracts includes a consensus rule specifying that a consensus among a group of consensus nodes is reached based on a statistical function of votes associated with the consensus nodes, and the statistical function is configured to enable the consensus to be reached after obtaining votes from less than all of the group of consensus nodes.

In some embodiments, the consensus rule specifies that a consensus among the group of consensus nodes is reached if a percentage of the consensus nodes that give approval votes is greater than a predetermined percentage value.

In some embodiments, at least one of the consensus smart contracts includes a consensus rule specifying that after a consensus node receives a request for approval, the consensus node is deemed to have given approval vote if the consensus node does not respond within a predetermined period of time.

In some embodiments, at least one of the consensus smart contracts includes a consensus rule specifying that after a consensus node receives a request for approval, the consensus node is deemed to abstain from voting if the consensus node does not respond within a predetermined period of time.

In some embodiments, at least one of the consensus smart contracts specifies at least one of (i) circumstances in which the consensus smart contract is effective and can be called by a process smart contract, or (ii) circumstances in which the consensus smart contract is ineffective and cannot be called by a process smart contract.

In some embodiments, each consensus smart contract specifies at least one of (i) a first period of time that the consensus smart contract is effective and can be called by a process smart contract, in which outside the first period of time the consensus smart contract is ineffective and cannot be called by a process smart contract, or (ii) a first range of block heights of a blockchain that the consensus smart contract is effective and can be called by a process smart contract, in which outside the first range of block heights of the blockchain the consensus smart contract is ineffective and cannot be called by a process smart contract.

In some embodiments, at least one of the consensus smart contracts includes a consensus rule specifying that a consensus regarding whether to approve or reject an item is sought from a first group of consensus nodes, and if a consensus cannot be obtained from the first group of consensus nodes, a consensus regarding whether to approve or reject the item is sought from a second group of consensus nodes.

In some embodiments, each consensus smart contract specifies a contact method for each of the consensus nodes, and upon execution the consensus smart contract sends a request for approval of the item to each consensus node using the contact method associated with the consensus node.

In some embodiments, at least one consensus smart contract is configured to accept an argument list that specifies which consensus nodes need to participate in the consensus process, and executing the process smart contract includes passing, from the process smart contract, a list of consensus nodes as arguments to the consensus smart contract.

At 466, one or more process smart contracts are executed, including for each process smart contract, calling one or more consensus smart contracts, and each consensus smart contract is configured to determine whether a consensus is reached among a plurality of consensus nodes. The same consensus smart contract is called by multiple process smart contracts. The consensus smart contract uses the private key of the consensus smart contract to digitally sign a message requesting a vote on whether to approve or reject an item, and sends the digitally signed message to the plurality of consensus nodes. The public key of the consensus smart contract enables the consensus nodes to validate the message sent from the consensus smart contract. Each process smart contract further performs an action based on the result of the determination of whether a consensus is reached.

For example, the consensus smart contract 420 is called by the process smart contracts 414 and 418, and the consensus smart contract 424 is called by the process smart contracts 416 and 418 (FIG. 6).

FIG. 9 is a flowchart of an example of a process 470 for implementing processes that include determining consensus among a plurality of consensus nodes. For convenience, the process 470 will be described as being performed by a system of one or more computers, located in one or more locations, and programmed appropriately in accordance with this specification. For example, a computing system, e.g., the computing system 106 or 108 of FIG. 1, appropriately programmed, can perform the process 470. The process 470 includes the following steps.

At 472, a first smart contract is executed on a blockchain. The first smart contract includes code for implementing a first process having a plurality of stages, and one of the stages includes executing a consensus smart contract on the blockchain. Executing the consensus smart contract includes executing code for implementing a consensus process for determining consensus among two or more consensus nodes according to a set of one or more consensus rules. The consensus smart contract includes information about a contact method for each of the consensus nodes, and the consensus smart contract includes a public key that is used by the consensus nodes for securely transmitting votes to the second smart contract. A private key corresponding to the public key is stored in a key management system associated with the blockchain.

For example, the first smart contract can be the process smart contract 330 (FIGS. 3 and 4), 414, 416, 418 (FIG. 6), or 430 (FIG. 7). The plurality of stages can be the stages 366a, 366b, 366c, 366d, 366e (FIG. 4), the stages 426a, 426b, 426c, 426d, the stages 426e, 426f, 426g, 426h, 426i, 426j (FIG. 6), and the stages 456 and 458 (FIG. 7). The consensus smart contract can be the consensus smart contact 332 (FIGS. 3 and 4), 420, 422, 424 (FIG. 6), or 432 (FIG. 7). For example, the consensus nodes can be the consensus node B 324, consensus node C 326, consensus node D 328, consensus node E 338, consensus node F 340 (FIG. 3), and the consensus nodes node1, node2, node4, and node5 (FIG. 7). The set of one or more consensus rules can be the consensus ruleset 350 (FIG. 4). The public key can be the public key 390 (FIG. 5).

In some embodiments, the set of one or more consensus rules specify that a consensus is reached based on a statistical function of votes associated with the consensus nodes, and the statistical function is configured to enable a consensus to be reached after obtaining votes from less than all of the consensus nodes.

In some embodiments, the set of one or more consensus rules specify that a consensus is reached if a percentage of consensus nodes that give approval votes is greater than a predetermined percentage value.

In some embodiments, the set of one or more consensus rules specify that after a consensus node receives a request for approval, the consensus node is deemed to have given approval if the consensus node does not respond within a predetermined period of time.

In some embodiments, the set of one or more consensus rules specify that after a consensus node receives a request for approval, the consensus node is deemed to abstain from voting if the consensus node does not respond within a predetermined period of time.

In some embodiments, the consensus smart contract specifies at least one of (i) circumstances in which the consensus smart contract is effective and can be called by the first smart contract, or (ii) circumstances in which the consensus smart contract is ineffective and cannot be called by the first smart contract.

In some embodiments, the consensus smart contract specifies at least one of (i) what period of time the consensus smart contract is effective and can be called by the first smart contract, or (ii) a range of block height of a blockchain for which the consensus smart contract is effective and can be called by the first smart contract.

In some embodiments, the set of one or more consensus rules specify that a consensus regarding whether to approve or reject an item is sought from a first group of consensus nodes, and if a consensus cannot be obtained from the first group of consensus nodes, a consensus regarding whether to approve or reject the item is sought from a second group of consensus nodes.

In some embodiments, the consensus smart contract is configured to accept an argument list that specifies which consensus nodes need to participate in the consensus process, and executing the first smart contract includes passing, from the first smart contract, a list of consensus nodes as arguments to the consensus smart contract.

At 474, the results of execution of the first smart contract is recorded in the blockchain. For example, the blockchain can be the blockchain 435 (FIG. 7).

Figure 10:
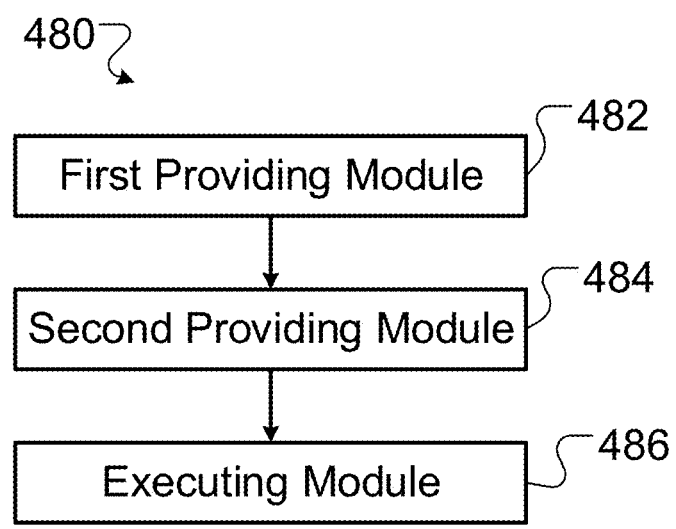
FIGS. 10 and 11 depict examples of modules of apparatuses in accordance with embodiments of this specification.

FIG. 10 is a diagram of an example of modules of an apparatus 480 in accordance with embodiments of this specification. The apparatus 480 can be an example of an embodiment of a blockchain node that is configured to implement processes that include determining consensus among a plurality of consensus nodes. The apparatus 480 can correspond to the embodiments described above, and the apparatus 480 includes the following:

- A first providing module 482 that provides a plurality of process smart contracts, in which each process smart contract is configured to execute on a blockchain, each process smart contract includes code for implementing a process that includes two or more steps, at least one of the steps involves determining whether a consensus is reached regarding whether to approve or reject an item, and at least one of the steps involves performing an action based on the determination of whether a consensus is reached;
- a second providing module 484 that provides a plurality of consensus smart contracts, in which each process smart contract is configured to execute on a blockchain, each consensus smart contract includes code for implementing a process for determining consensus among a plurality of consensus nodes according to one or more consensus rules, each consensus smart contract includes a public key that is used by the consensus nodes for securely transmitting votes to the consensus smart contract, wherein a private key corresponding to the public key is stored in a key management system associated with the blockchain; and
- an executing module 486 that executes one or more process smart contracts, including calling one or more consensus smart contracts to determine whether a consensus is reached among a plurality of consensus nodes, wherein a same consensus smart contract is called by multiple process smart contracts.

In an optional embodiment, at least one of the consensus smart contracts includes a consensus rule specifying that a consensus among a group of consensus nodes is reached based on a statistical function of votes associated with the consensus nodes, and the statistical function is configured to enable the consensus to be reached after obtaining votes from less than all of the group of consensus nodes.

In an optional embodiment, the consensus rule specifies that a consensus among the group of consensus nodes is reached if a percentage of the consensus nodes that give approval votes is greater than a predetermined percentage value.

In an optional embodiment, at least one of the consensus smart contracts includes a consensus rule specifying that after a consensus node receives a request for approval, the consensus node is deemed to have given approval vote if the consensus node does not respond within a predetermined period of time.

In an optional embodiment, at least one of the consensus smart contracts includes a consensus rule specifying that after a consensus node receives a request for approval, the consensus node is deemed to abstain from voting if the consensus node does not respond within a predetermined period of time.

In an optional embodiment, at least one of the consensus smart contracts specifies at least one of (i) circumstances in which the consensus smart contract is effective and can be called by a process smart contract, or (ii) circumstances in which the consensus smart contract is ineffective and cannot be called by a process smart contract.

In an optional embodiment, each consensus smart contract specifies at least one of (i) a first period of time that the consensus smart contract is effective and can be called by a process smart contract, in which outside the first period of time the consensus smart contract is ineffective and cannot be called by a process smart contract, or (ii) a first range of block heights of a blockchain that the consensus smart contract is effective and can be called by a process smart contract, in which outside the first range of block heights of the blockchain the consensus smart contract is ineffective and cannot be called by a process smart contract.

In an optional embodiment, at least one of the consensus smart contracts includes a consensus rule specifying that a consensus regarding whether to approve or reject an item is sought from a first group of consensus nodes, and if a consensus cannot be obtained from the first group of consensus nodes, a consensus regarding whether to approve or reject the item is sought from a second group of consensus nodes.

In an optional embodiment, each consensus smart contract specifies a contact method for each of the consensus nodes, and upon execution the consensus smart contract sends a request for approval of the item to each consensus node using the contact method associated with the consensus node.

In an optional embodiment, at least one consensus smart contract is configured to accept an argument list that specifies which consensus nodes need to participate in the consensus process, and executing the process smart contract includes passing, from the process smart contract, a list of consensus nodes as arguments to the consensus smart contract.

Figure 11:
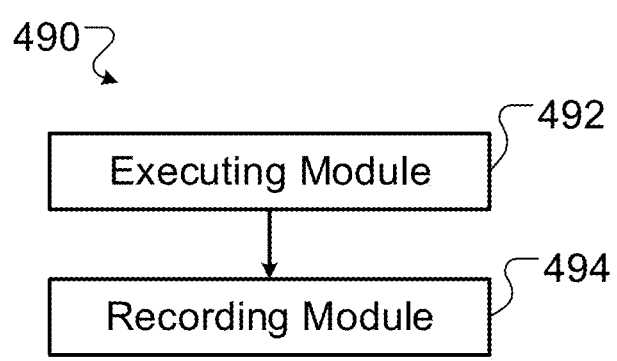

FIG. 11 is a diagram of an example of modules of an apparatus 480 in accordance with embodiments of this specification. The apparatus 480 can be an example of an embodiment of a blockchain node that is configured to implement processes that include determining consensus among a plurality of consensus nodes. The apparatus 480 can correspond to the embodiments described above, and the apparatus 480 includes the following:

- An executing module 492 that executes a first smart contract on a blockchain, wherein the first smart contract includes code for implementing a first process having a plurality of stages, one of the stages includes executing a consensus smart contract on the blockchain, wherein executing the consensus smart contract includes executing code for implementing a consensus process for determining consensus among two or more consensus nodes according to a set of one or more consensus rules, the consensus smart contract includes information about a contact method for each of the consensus nodes, the consensus smart contract includes a public key that is used by the consensus nodes for securely transmitting votes to the second smart contract, wherein a private key corresponding to the public key is stored in a key management system associated with the blockchain; and a recording module 494 that records results of execution of the first smart contract in the blockchain.

In an optional embodiment, the set of one or more consensus rules specify that a consensus is reached based on a statistical function of votes associated with the consensus nodes, and the statistical function is configured to enable a consensus to be reached after obtaining votes from less than all of the consensus nodes.

In an optional embodiment, the set of one or more consensus rules specify that a consensus is reached if a percentage of consensus nodes that give approval votes is greater than a predetermined percentage value.

In an optional embodiment, the set of one or more consensus rules specify that after a consensus node receives a request for approval, the consensus node is deemed to have given approval if the consensus node does not respond within a predetermined period of time.

In an optional embodiment, the set of one or more consensus rules specify that after a consensus node receives a request for approval, the consensus node is deemed to abstain from voting if the consensus node does not respond within a predetermined period of time.

In an optional embodiment, the consensus smart contract specifies at least one of (i) circumstances in which the consensus smart contract is effective and can be called by the first smart contract, or (ii) circumstances in which the consensus smart contract is ineffective and cannot be called by the first smart contract.

In an optional embodiment, the consensus smart contract specifies at least one of (i) what period of time the consensus smart contract is effective and can be called by the first smart contract, or (ii) a range of block height of a blockchain for which the consensus smart contract is effective and can be called by the first smart contract.

In an optional embodiment, the set of one or more consensus rules specify that a consensus regarding whether to approve or reject an item is sought from a first group of consensus nodes, and if a consensus cannot be obtained from the first group of consensus nodes, a consensus regarding whether to approve or reject the item is sought from a second group of consensus nodes.

In an optional embodiment, the consensus smart contract is configured to accept an argument list that specifies which consensus nodes need to participate in the consensus process, and executing the first smart contract includes passing, from the first smart contract, a list of consensus nodes as arguments to the consensus smart contract.

The system, apparatus, module, or unit illustrated in the previous embodiments can be implemented by using a computer chip or an entity, or can be implemented by using a product having a certain function. A typical embodiment device is a computer, and the computer can be a personal computer, a laptop computer, a cellular phone, a camera phone, a smartphone, a personal digital assistant, a media player, a navigation device, an email receiving and sending device, a game console, a tablet computer, a wearable device, or any combination of these devices.

For an embodiment process of functions and roles of each module in the apparatus, references can be made to an embodiment process of corresponding steps in the previous method. Details are omitted here for simplicity.

Because an apparatus embodiment basically corresponds to a method embodiment, for related parts, references can be made to related descriptions in the method embodiment. The previously described apparatus embodiment is merely an example. The modules described as separate parts may or may not be physically separate, and parts displayed as modules may or may not be physical modules, may be located in one position, or may be distributed on a number of network modules. Some or all of the modules can be selected based on actual demands to achieve the objectives of the solutions of the specification. A person of ordinary skill in the art can understand and implement the embodiments of the present application without creative efforts.

Referring again to FIGS. 10 and 11, it can be interpreted as illustrating an internal functional module and a structure of a blockchain node. An execution body in essence can be an electronic device, and the electronic device includes the following: one or more processors; and one or more computer-readable memories configured to store an executable instruction of the one or more processors. In some embodiments, the one or more computer-readable memories are coupled to the one or more processors and have programming instructions stored thereon that are executable by the one or more processors to perform algorithms, methods, functions, processes, flows, and procedures, as described in this specification. This specification also provides one or more non-transitory computer-readable storage media coupled to one or more processors and having instructions stored thereon which, when executed by the one or more processors, cause the one or more processors to perform operations in accordance with embodiments of the methods provided herein.

This specification further provides a system for implementing the methods provided herein. The system includes one or more processors, and a computer-readable storage medium coupled to the one or more processors having instructions stored thereon which, when executed by the one or more processors, cause the one or more processors to perform operations in accordance with embodiments of the methods provided herein.

Embodiments of the subject matter and the actions and operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, e.g., one or more modules of computer program instructions, encoded on a computer program carrier, for execution by, or to control the operation of, data processing apparatus. For example, a computer program carrier can include one or more computer-readable storage media that have instructions encoded or stored thereon. The carrier may be a tangible non-transitory computer-readable medium, such as a magnetic, magneto optical, or optical disk, a solid state drive, a random access memory (RAM), a read-only memory (ROM), or other types of media. Alternatively, or in addition, the carrier may be an artificially generated propagated signal, e.g., a machine-generated electrical, optical, or electromagnetic signal that is generated to encode information for transmission to suitable receiver apparatus for execution by a data processing apparatus. The computer storage medium can be or be part of a machine-readable storage device, a machine-readable storage substrate, a random or serial access memory device, or a combination of one or more of them. A computer storage medium is not a propagated signal.

A computer program, which may also be referred to or described as a program, software, a software application, an app, a module, a software module, an engine, a script, or code, can be written in any form of programming language, including compiled or interpreted languages, or declarative or procedural languages; and it can be deployed in any form, including as a stand-alone program or as a module, component, engine, subroutine, or other unit suitable for executing in a computing environment, which environment may include one or more computers interconnected by a data communication network in one or more locations.

A computer program may, but need not, correspond to a file in a file system. A computer program can be stored in a portion of a file that holds other programs or data, e.g., one or more scripts stored in a markup language document, in a single file dedicated to the program in question, or in multiple coordinated files, e.g., files that store one or more modules, sub programs, or portions of code.

Processors for execution of a computer program include, by way of example, both general- and special-purpose microprocessors, and any one or more processors of any kind of digital computer. Generally, a processor will receive the instructions of the computer program for execution as well as data from a non-transitory computer-readable medium coupled to the processor.

The term "data processing apparatus" encompasses all kinds of apparatuses, devices, and machines for processing data, including by way of example a programmable processor, a computer, or multiple processors or computers. Data processing apparatus can include special-purpose logic circuitry, e.g., an FPGA (field programmable gate array), an ASIC (application specific integrated circuit), or a GPU (graphics processing unit). The apparatus can also include, in addition to hardware, code that creates an execution environment for computer programs, e.g., code that constitutes processor firmware, a protocol stack, a database management system, an operating system, or a combination of one or more of them.

The processes and logic flows described in this specification can be performed by one or more computers or processors executing one or more computer programs to perform operations by operating on input data and generating output. The processes and logic flows can also be performed by special-purpose logic circuitry, e.g., an FPGA, an ASIC, or a GPU, or by a combination of special-purpose logic circuitry and one or more programmed computers.

Computers suitable for the execution of a computer program can be based on general or special-purpose microprocessors or both, or any other kind of central processing unit. Generally, a central processing unit will receive instructions and data from a read only memory or a random access memory or both. Elements of a computer can include a central processing unit for executing instructions and one or more memory devices for storing instructions and data. The central processing unit and the memory can be supplemented by, or incorporated in, special-purpose logic circuitry.

Generally, a computer will also include, or be operatively coupled to receive data from or transfer data to one or more storage devices. The storage devices can be, for example, magnetic, magneto optical, or optical disks, solid state drives, or any other type of non-transitory, computer-readable media. However, a computer need not have such devices. Thus, a computer may be coupled to one or more storage devices, such as, one or more memories, that are local and/or remote. For example, a computer can include one or more local memories that are integral components of the computer, or the computer can be coupled to one or more remote memories that are in a cloud network. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Components can be "coupled to" each other by being commutatively such as electrically or optically connected to one another, either directly or via one or more intermediate components. Components can also be "coupled to" each other if one of the components is integrated into the other. For example, a storage component that is integrated into a processor (e.g., an L2 cache component) is "coupled to" the processor.

To provide for interaction with a user, embodiments of the subject matter described in this specification can be implemented on, or configured to communicate with, a computer having a display device, e.g., a LCD (liquid crystal display) monitor, for displaying information to the user, and an input device by which the user can provide input to the computer, e.g., a keyboard and a pointing device, e.g., a mouse, a trackball or touchpad. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser, or by interacting with an app running on a user device, e.g., a smartphone or electronic tablet. Also, a computer can interact with a user by sending text messages or other forms of message to a personal device, e.g., a smartphone that is running a messaging application, and receiving responsive messages from the user in return.

This specification uses the term "configured to" in connection with systems, apparatus, and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions. For special-purpose logic circuitry to be configured to perform particular operations or actions means that the circuitry has electronic logic that performs the operations or actions.

While this specification contains many specific embodiment details, these should not be construed as limitations on the scope of what is being claimed, which is defined by the claims themselves, but rather as descriptions of features that may be specific to particular embodiments. Certain features that are described in this specification in the context of separate embodiments can also be realized in combination in a single embodiment. Conversely, various features that are described in the context of a single embodiments can also be realized in multiple embodiments separately or in any suitable subcombination. Moreover, although features may be described above as acting in certain combinations and even initially be claimed as such, one or more features from a claimed combination can in some cases be excised from the combination, and the claim may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

The invention claimed is:

1. A computer-implemented method, comprising:
providing a plurality of process smart contracts, wherein each of the plurality of process smart contracts is configured to execute on a first blockchain, each process smart contract includes programming codes for implementing a process that includes two or more steps, at least one of the steps involves determining whether a consensus is reached regarding whether to approve or reject an item, and at least one of the steps involves performing an action based on the determination of whether a consensus is reached;
providing a plurality of consensus smart contracts, wherein each of the plurality of process smart contracts is configured to execute on a second blockchain, each consensus smart contract includes programming codes for implementing a process for determining consensus among a plurality of consensus nodes according to one or more consensus rules, each consensus smart contract includes a public key, wherein a private key of the consensus smart contract corresponding to the public key is stored in a key management system associated with the second blockchain; and
for each process smart contract, calling one or more consensus smart contracts, wherein each consensus smart contract is configured to determine whether a consensus is reached among a plurality of consensus nodes, wherein a same consensus smart contract is called by multiple process smart contracts,
wherein the consensus smart contract uses the private key of the consensus smart contract to digitally sign a message requesting a vote on whether to approve or reject an item, and sends the message that is digitally signed to the plurality of consensus nodes,
wherein the public key of the consensus smart contract enables the consensus nodes to validate the message sent from the consensus smart contract, and
performing an action based on a result of the determination of whether a consensus is reached.

2. The computer-implemented method of claim 1, wherein at least one of the consensus smart contracts includes a consensus rule specifying that a consensus among a group of consensus nodes is reached based on a statistical function of votes associated with the consensus nodes, and the statistical function of votes is configured to enable the consensus to be reached after obtaining votes from less than all of the group of consensus nodes.

3. The computer-implemented method of claim 2, wherein the consensus rule specifies that a consensus among the group of consensus nodes is reached if a percentage of the consensus nodes that give approval votes is greater than a predetermined percentage value.

4. The computer-implemented method of claim 1, wherein at least one of the consensus smart contracts includes a consensus rule specifying that after a consensus node receives a request for approval, the consensus node is deemed to have given approval vote if the consensus node does not respond within a predetermined period of time.

5. The computer-implemented method of claim 1, wherein at least one of the consensus smart contracts includes a consensus rule specifying that after a consensus node receives a request for approval, the consensus node is deemed to abstain from voting if the consensus node does not respond within a predetermined period of time.

6. The computer-implemented method of claim 1, wherein at least one of the plurality of consensus smart contracts specifies at least one of (i) circumstances in which the at least one of the plurality of consensus smart contracts is effective and can be called by a process smart contract, or (ii) circumstances in which the at least one of the plurality of consensus smart contracts is ineffective and cannot be called by a process smart contract.

7. The computer-implemented method of claim 1, wherein each consensus smart contract specifies at least one of (i) a first period of time that the consensus smart contract is effective and can be called by a process smart contract, in which outside the first period of time the consensus smart contract is ineffective and cannot be called by a process smart contract, or (ii) a first range of block heights of a blockchain that the consensus smart contract is effective and can be called by a process smart contract, in which outside the first range of block heights of the blockchain the consensus smart contract is ineffective and cannot be called by a process smart contract.

8. The computer-implemented method of claim 1, wherein at least one of the consensus smart contracts includes a consensus rule specifying that a consensus regarding whether to approve or reject an item is sought from a first group of consensus nodes, and if a consensus cannot be obtained from the first group of consensus nodes, a consensus regarding whether to approve or reject the item is sought from a second group of consensus nodes.

9. The computer-implemented method of claim 1, wherein each consensus smart contract specifies a contact method for each of the consensus nodes, and upon execution the consensus smart contract sends a request for approval of the item to each consensus node using the contact method associated with the consensus node.

10. The computer-implemented method of claim 1, wherein at least one consensus smart contract is configured to accept an argument list that specifies which consensus nodes need to participate in a consensus process, and executing the process smart contract comprises passing, from the process smart contract, a list of consensus nodes as arguments to the consensus smart contract.

11. A computer-implemented system, comprising:
one or more computers; and
one or more computer memory devices interoperably coupled with the one or more computers and having tangible, non-transitory, machine-readable media storing one or more instructions that, when executed by the one or more computers, perform one or more operations comprising:

providing a plurality of process smart contracts, wherein each of the plurality of process smart contracts is configured to execute on a first blockchain, each process smart contract includes programming codes for implementing a process that includes two or more steps, at least one of the steps involves determining whether a consensus is reached regarding whether to approve or reject an item, and at least one of the steps involves performing an action based on the determination of whether a consensus is reached;

providing a plurality of consensus smart contracts, wherein each of the plurality of process smart contracts is configured to execute on a second blockchain, each consensus smart contract includes programming codes for implementing a process for determining consensus among a plurality of consensus nodes according to one or more consensus rules, each consensus smart contract includes a public key, wherein a private key of the consensus smart contract corresponding to the public key is stored in a key management system associated with the second blockchain; and for each process smart contract, calling one or more consensus smart contracts, wherein each consensus smart contract is configured to determine whether a consensus is reached among a plurality of consensus nodes, wherein a same consensus smart contract is called by multiple process smart contracts, wherein the consensus smart contract uses the private key of the consensus smart contract to digitally sign a message requesting a vote on whether to approve or reject an item, and sends the message that is digitally signed to the plurality of consensus nodes, wherein the public key of the consensus smart contract enables the consensus nodes to validate the message sent from the consensus smart contract, and performing an action based on a result of the determination of whether a consensus is reached.

12. The computer-implemented system of claim 11, wherein at least one of the consensus smart contracts includes a consensus rule specifying that a consensus among a group of consensus nodes is reached based on a statistical function of votes associated with the consensus nodes, and the statistical function of votes is configured to enable the consensus to be reached after obtaining votes from less than all of the group of consensus nodes.

13. The computer-implemented system of claim 12, wherein the consensus rule specifies that a consensus among the group of consensus nodes is reached if a percentage of the consensus nodes that give approval votes is greater than a predetermined percentage value.

14. The computer-implemented system of claim 11, wherein at least one of the consensus smart contracts includes a consensus rule specifying that after a consensus node receives a request for approval, the consensus node is deemed to have given approval vote if the consensus node does not respond within a predetermined period of time.

15. The computer-implemented system of claim 11, wherein at least one of the consensus smart contracts includes a consensus rule specifying that after a consensus node receives a request for approval, the consensus node is deemed to abstain from voting if the consensus node does not respond within a predetermined period of time.

16. The computer-implemented system of claim 11, wherein at least one of the plurality of consensus smart contracts specifies at least one of (i) circumstances in which the at least one of the plurality of consensus smart contracts is effective and can be called by a process smart contract, or (ii) circumstances in which the at least one of the plurality of consensus smart contracts is ineffective and cannot be called by a process smart contract.

17. The computer-implemented system of claim 11, wherein each consensus smart contract specifies at least one of (i) a first period of time that the consensus smart contract is effective and can be called by a process smart contract, in which outside the first period of time the consensus smart contract is ineffective and cannot be called by a process smart contract, or (ii) a first range of block heights of a blockchain that the consensus smart contract is effective and can be called by a process smart contract, in which outside the first range of block heights of the blockchain the consensus smart contract is ineffective and cannot be called by a process smart contract.

18. The computer-implemented system of claim 11, wherein at least one of the consensus smart contracts includes a consensus rule specifying that a consensus regarding whether to approve or reject an item is sought from a first group of consensus nodes, and if a consensus cannot be obtained from the first group of consensus nodes, a consensus regarding whether to approve or reject the item is sought from a second group of consensus nodes.

19. A non-transitory, computer-readable medium storing one or more instructions executable by a computer system to perform operations comprising:

providing a plurality of process smart contracts, wherein each of the plurality of process smart contracts is configured to execute on a first blockchain, each process smart contract includes programming codes for implementing a process that includes two or more steps, at least one of the steps involves determining whether a consensus is reached regarding whether to approve or reject an item, and at least one of the steps involves performing an action based on the determination of whether a consensus is reached;

providing a plurality of consensus smart contracts, wherein each of the plurality of process smart contracts is configured to execute on a second blockchain, each consensus smart contract includes programming codes for implementing a process for determining consensus among a plurality of consensus nodes according to one or more consensus rules, each consensus smart contract includes a public key, wherein a private key of the consensus smart contract corresponding to the public key is stored in a key management system associated with the second blockchain; and for each process smart contract, calling one or more consensus smart contracts, wherein each consensus smart contract is configured to determine whether a consensus is reached among a plurality of consensus nodes, wherein a same consensus smart contract is called by multiple process smart contracts, wherein the consensus smart contract uses the private key of the consensus smart contract to digitally sign a message requesting a vote on whether to approve or reject an item, and sends the message that is digitally signed to the plurality of consensus nodes, wherein the public key of the consensus smart contract enables the consensus nodes to validate the message sent from the consensus smart contract, and performing an action based on a result of the determination of whether a consensus is reached.

20. The non-transitory, computer-readable medium of claim 19, wherein at least one of the consensus smart contracts includes a consensus rule specifying that a consensus among a group of consensus nodes is reached based on a statistical function of votes associated with the consensus nodes, and the statistical function of votes is configured to enable the consensus to be reached after obtaining votes from less than all of the group of consensus nodes.

* * * * *

UNITED STATES PATENT AND TRADEMARK OFFICE
CERTIFICATE OF CORRECTION

PATENT NO. : 11,057,221 B2  
APPLICATION NO. : 17/138739  
DATED : July 6, 2021  
INVENTOR(S) : Yujun Peng Page 1 of 1

It is certified that error appears in the above-identified patent and that said Letters Patent is hereby corrected as shown below:

In the Specification

Column 1, Line 65, delete "process" and insert -- consensus --, therefor.

Column 28, Line 26, delete "process" and insert -- consensus --, therefor.

Column 31, Line 23, delete "process" and insert -- consensus --, therefor.

In the Claims

Column 37, Line 37, delete "process" and insert -- consensus --, therefor.

Column 39, Line 16, delete "process" and insert -- consensus --, therefor.

Column 40, Line 44, delete "process" and insert -- consensus --, therefor.

Signed and Sealed this  
Eleventh Day of January, 2022

Drew Hirshfeld  
*Performing the Functions and Duties of the*  
*Under Secretary of Commerce for Intellectual Property and*  
*Director of the United States Patent and Trademark Office*